US011685058B2

United States Patent
Yerazunis et al.

(10) Patent No.: US 11,685,058 B2
(45) Date of Patent: Jun. 27, 2023

(54) SOFT ROBOTIC TENTACLE GRIPPER

(71) Applicant: Mitsubishi Electric Research Laboratories, Inc., Cambridge, MA (US)

(72) Inventors: William Yerazunis, Cambridge, MA (US); Erin Solomon, Cambridge, MA (US); James McAleenan, Reading, MA (US)

(73) Assignee: MITSUBISHI ELECTRIC RESEARCH LABORATORIES INC., Cambridge, MA (US)

( * ) Notice: Subject to any disclaimer, the term of this patent is extended or adjusted under 35 U.S.C. 154(b) by 288 days.

(21) Appl. No.: 17/101,500

(22) Filed: Nov. 23, 2020

(65) Prior Publication Data

US 2022/0161444 A1    May 26, 2022

(51) Int. Cl.
*B25J 9/16*         (2006.01)
*B25J 15/02*      (2006.01)
(Continued)

(52) U.S. Cl.
CPC ......... *B25J 15/0233* (2013.01); *B25J 9/1612* (2013.01); *B25J 9/1669* (2013.01);
(Continued)

(58) Field of Classification Search
CPC ............ B29C 49/42336; B29C 66/863; Y10T 74/20305; B25J 15/0233; B25J 9/1612;
(Continued)

(56) References Cited

U.S. PATENT DOCUMENTS 6,244,644 B1 *   6/2001   Lovchik ............... B25J 15/0009
                                                                     901/29
9,981,377 B2      5/2018   Morin et al.
(Continued)

OTHER PUBLICATIONS

Thien-Dang Nguyen and Jessica Burgner-Kahrs, "A Tendon-Driven Continuum Robot with Extensible Sections", 2015, IEEE/RSJ International Conference on Intelligent Robots and Systems (IROS), pp. 2130-2135.*

(Continued)

*Primary Examiner* — Adam R Mott
*Assistant Examiner* — Sagar K C
(74) *Attorney, Agent, or Firm* — Gennadiy Vinokur; Hironori Tsukamoto

(57) ABSTRACT

A soft gripper including tentacles, each tentacle includes lower and upper members connected by a connector. Each member includes guide discs, and each guide disc includes a ring with passthrough holes, and a spacer located in a donut hole of the ring with passthrough holes, the passthrough holes collectively define cable pathways. The connector includes a center thru-hole and transfer channels. Cables have proximal ends attached to actuators and extend through apertures of a baseplate located at a proximal end of the lower member. A set of lower cables extend through the lower ring passthrough holes to couple to a distal lower guide disc. A set of upper cables extend through the lower spacer passthrough holes, through the transfer channels to the upper ring passthrough holes to couple to a distal upper guide ring, and an end cap is attached to the distal end of the upper member.

21 Claims, 21 Drawing Sheets

(Multi-tentacle gripper with an ability to grasp objects of different sizes (ranging 6mm to 150mm), weights (ranging 0-4.5+kg), and shapes including irregular shapes, inorganic shapes (rocks, manmade objects, i.e. auto parts), organic objects (unprocessed raw fruit, processed foods, bake foods, non-baked foods, animal products (meat, eggs, cheese)).

(51) Int. Cl.
 B25J 15/10 (2006.01)
 B25J 13/08 (2006.01)
 B25J 17/02 (2006.01)
(52) U.S. Cl.
 CPC .............. B25J 13/08 (2013.01); B25J 15/10 (2013.01); B25J 17/0258 (2013.01)
(58) Field of Classification Search
 CPC . B25J 9/1669; B25J 13/08; B25J 15/10; B25J 17/0258; B25J 9/104; B25J 15/12; B25J 9/06; B25J 9/065; G05B 2219/39489; G05B 2219/39496
 See application file for complete search history.

(56) References Cited

U.S. PATENT DOCUMENTS

| | | | |
|---|---|---|---|
| 10,022,877 | B2 | 7/2018 | Wang |
| 2012/0290133 | A1* | 11/2012 | Goto ................... B25J 15/0253 294/213 |
| 2014/0163731 | A1* | 6/2014 | Shi ......................... B25J 9/0096 700/250 |
| 2015/0019013 | A1* | 1/2015 | Rose ....................... B25J 13/08 702/41 |
| 2016/0016319 | A1* | 1/2016 | Remirez ................. A61B 34/71 74/490.04 |
| 2017/0231701 | A1 | 8/2017 | Cohen et al. |
| 2018/0304458 | A1* | 10/2018 | Takagi ..................... B25J 9/104 |
| 2020/0016747 | A1* | 1/2020 | Lee ......................... B25J 9/104 |
| 2020/0107700 | A1* | 4/2020 | Hasser ..................... A61B 1/05 |
| 2021/0053215 | A1* | 2/2021 | Kim ....................... B25J 9/1687 |
| 2021/0402592 | A1* | 12/2021 | Takagi .................... B25J 9/104 |

OTHER PUBLICATIONS

Srikanth Kolachalama and Sridhar Lakshmanan, "Continuum Robots for Manipulation Applications: A Survey", Jul. 2020, Journal of Robotics, pp. 1-19.*

Vasquez et al. The Bootup guide to homebrew twostage tentacle mechanisms, Sep. 13, 2016. Feb. 2, 2021. http://hackaday.com/2016/09/13/the-bootup-guide-to-homebrew . . . .

* cited by examiner

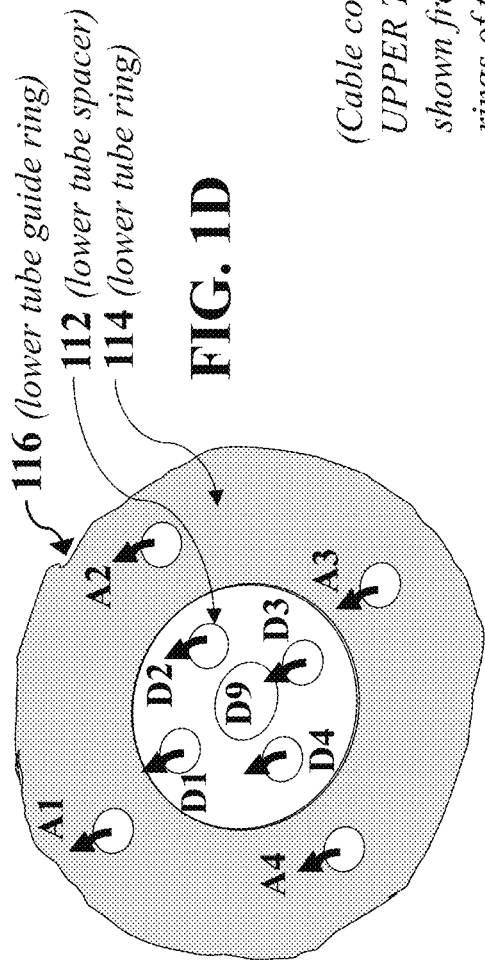

FIG. 1D

116 (lower tube guide ring)
112 (lower tube spacer)
114 (lower tube ring)

(LOWER TUBE Cable Configuration)
A1, A2, A3, A4

D1, D2, D3, D4
(Cables for UPPER TUBE Traveling through LOWER TUBE Configuration to the UPPER TUBE shown from cables exiting the rings of the LOWER TUBE rings)

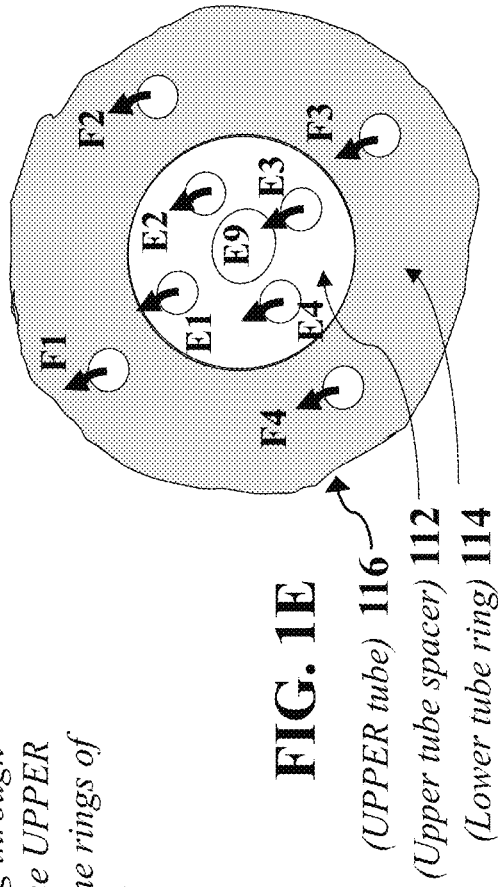

FIG. 1E

(UPPER tube) 116
(Upper tube spacer) 112
(Lower tube ring) 114

(Cable configuration for UPPER TUBE Spacer & Rings shown from cables exiting the rings of the UPPER TUBE rings )
F1, F2, F3, F4

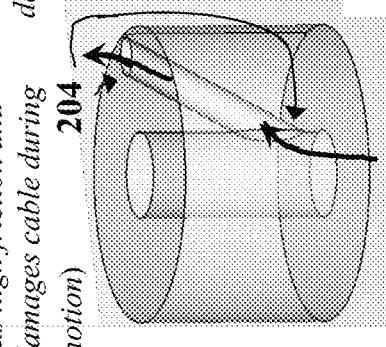
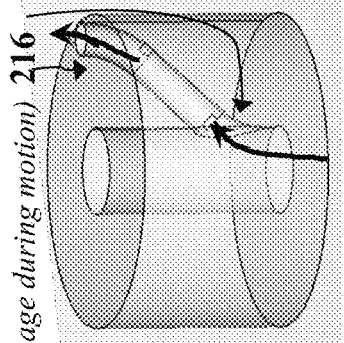
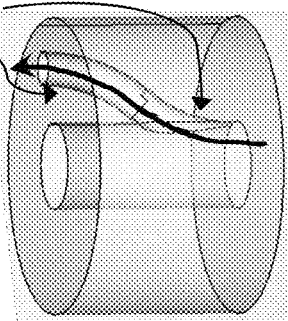

*(sharp angled corner has high friction and damages cable during motion)*

*(adding a radius curve to the transfer channel entry and exit apertures decreases friction and lessens cable damage during motion)*

*(increasing radius curve to a maximum based on geometric formula minimizes friction and cable material fatigue)*

Test Case A2 — Test Case B2 — Embodiments of disclosure

FIG. 2C

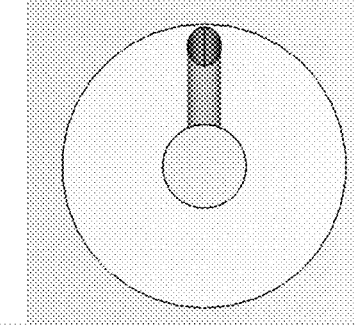
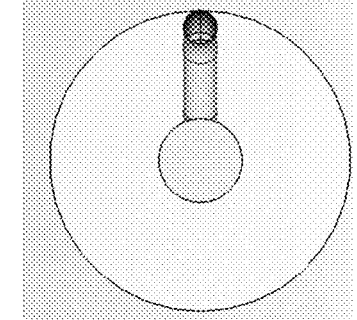
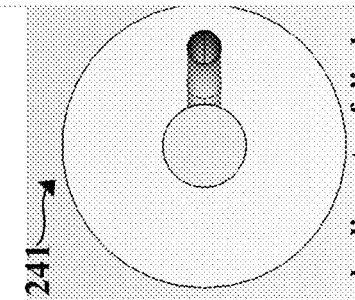

Test Case A2 — Test Case B2 — Embodiments of disclosure

FIG. 2B

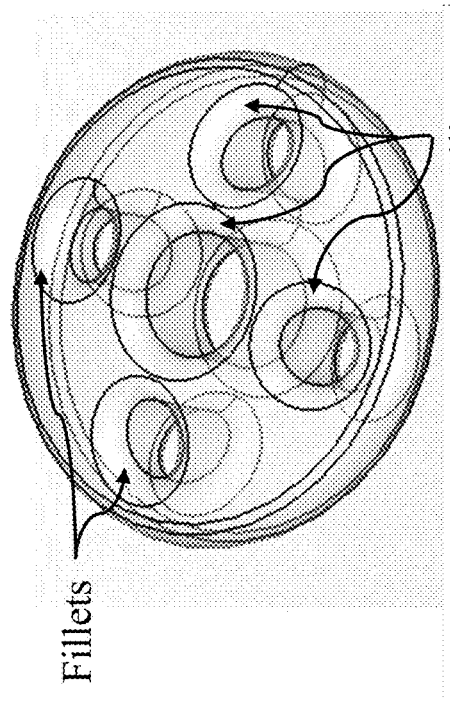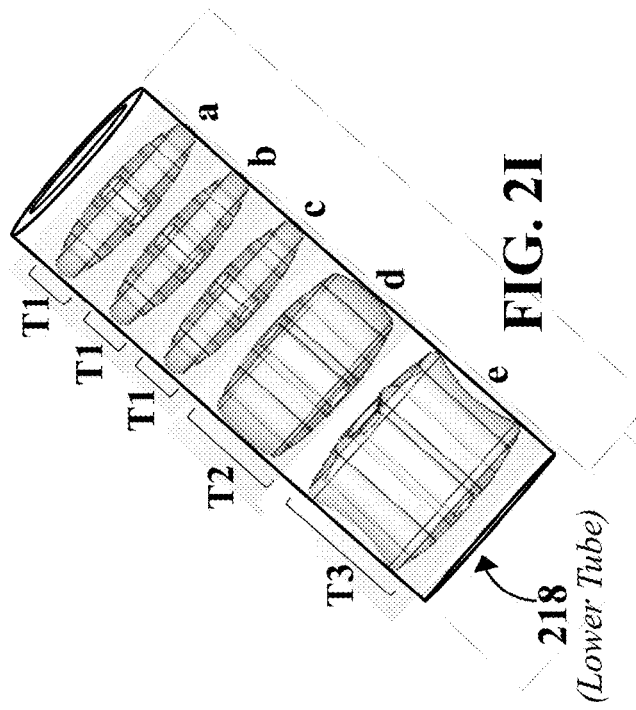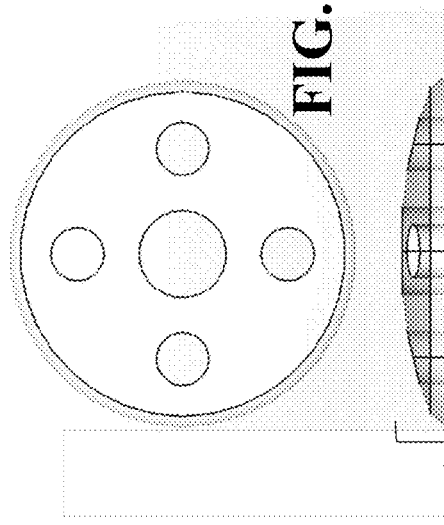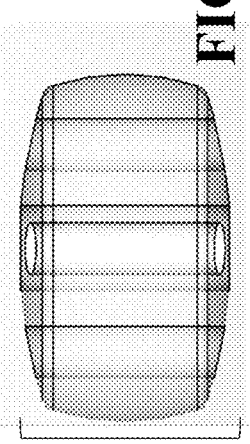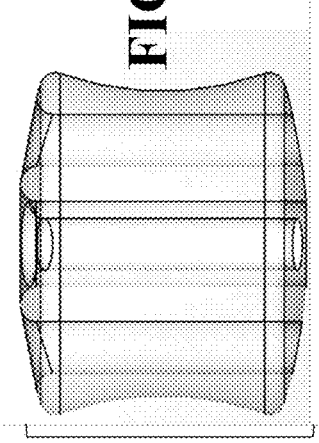
FIG. 2D
FIG. 2E
FIG. 2F
FIG. 2G
FIG. 2H
FIG. 2I

*(Side View of detachable partial glove device)*

*(Top View of detachable partial glove device)*

(Tentacles Transport Pencil) 510

(Tentacles Transport Bolts) 514

(Tentacles Transport Air Filter, Grip #1) 518

(Tentacles Transport Air Filter, Grip #2) 519

| Grasp Mode | Example Grasp | Max Pull at Grip Failure | Object | Pull Vector | No-load Current Draw (A) | Max Current Draw (A) | Failure Mode |
|---|---|---|---|---|---|---|---|
| Distal Wrap | | 36 nt (8 lb) | 10.3 mm tube | Out | 3.8 | 4.8 | Fingertips pulled off |
| Proximal Hug Wrap | | 67 nt (15 lb) | 10.3 mm tube | Out | 4.5 | 7.9 | cable ripped from servo |
| Proximal Hug Wrap | | 36 nt (8 lb) | 10.3 mm tube | Down | 4.8 | 6.6 | Tube Slipped out of grasp |
| Reverse Distal Wrap | | 49 nt (11 lb) | 10.3 mm tube | Out | 2.3 | 2.7 | Fingertips pulled off |
| Internal Counter Expanding Wrap | | 160 nt (36 lb) | 104 mm inside dia. tube | Out | 4.4 | 5.6 | Fingertips pulled off |
| Internal Expanding Distal Pinch | | 31 nt (7 lb) | 104 mm inside dia. tube | Out | 2.1 | 3 | Fingertips pulled off |
| Large External Pinch | | 18 nt (4 lb) | 147 mm outside dia. tube | Out | 3.1 | 3.7 | Fingertips pulled off |
| Extreme Distal Pinch | | 0.1 nt (0.02 lb) | 66 mm tube | Down | 2.3 | 2.3 | Object slipped from grasp |

FIG. 6B

SOFT ROBOTIC TENTACLE GRIPPER

FIELD

The present disclosure relates to soft robotic tentacle system, and more particularly to independently actuated tentacles by transmission system having upper cables extending through lower spacer pathways through transfer channels to upper ring pathways that uniquely provide minimum cable transmission friction, while the tentacles include near-full or full actuation to move objects within a workspace.

BACKGROUND

Conventional soft robotic grippers and/or endpoint effectors can be categorized as pneumatic grippers, hydraulic grippers, electromagnetic motor grippers and suction and vacuum grippers. Each conventional soft robotic gripper presents some benefits, but also carry with them many problems. For example, some of the problems conventional soft robotic grippers include being too heavy in overall weight and design, weak in terms of durability and longtime operational wear and tear, slow gripping performance in terms of time the grippers clasp an object and are limited in controllability or in some cases uncontrollable for truly dexterous manipulation. Some other problems include high maintenance requirements which limit the field of applications.

Regarding conventional hydraulic grippers, these devices include a hydraulic cylinder that slides or pivots the fingers together and apart. Some aspects of the conventional hydraulic grippers include a strong gripping force (10,000 Nt and up) powerful to bend and clamp thin steel sheets such as auto body panels. However, the conventional hydraulic grippers require a hydraulic power source. Further, some problems with the conventional hydraulic grippers is the slow take-in time to operate the retraction of the grippers, also they are very heavy in overall weight. Other problems include inflexible 2000-6000 PSI hoses. There are also environmental concerns using the conventional hydraulic grippers due to typical leaks, resulting in literally an EPA issue when cleaning up after a leak.

Regarding conventional electromagnetic motor grippers, these devices include an electromagnetic motor (servo, stepper, or similar motor) that actuates the fingers, arranged typically through a gear train. The conventional electromagnetic motor grippers require electricity to operate and a controlling CPU. However, some problems with the conventional electromagnetic motor grippers is that they are very slow as to an amount of take-in time for geared units, as well as have a weak grip when compared to the same weight of conventional air driven units. Other problems include a very poor grip strength to gripper weight ratio, along with the overall weight is heavy. Further problems include heat dissipation to the motors which results in limiting the overall strength.

Regarding conventional suction and vacuum grippers, these devices include a vacuum pump or vacuum venturi that generates a low-pressure area, sucking the gripped object against a nozzle which retains the object. The conventional suction and vacuum grippers require electricity or compressed air to generate the vacuum. Some problems with conventional suction and vacuum grippers are that they have very slow take-in time (greater than 3 seconds), along with weak gripper strength. Other problems include not "locating", the grasped object's pose which is uncontrolled (that is where in the gripper is unknown), other problems is the encompassing of the grasped object is inaccessible in the vacuum area.

Regarding conventional biomimetic/anthropomorphic grippers, wherein these devices include a gripper that attempts to be an analogue of an animal or human organ of manipulation. For example, a "tentacle" gripper attempts to combine the actuation of an octopus tentacle with the vacuum gripping disk of many cephalopod organisms, using an arm and gripper that are pneumatically driven.

There is a pressing need to develop a soft robot gripper to have an improved amount of operational performance levels in order to address the gripper industry's high growing diverse operational applications. For example, some improved operational gripper performances include grippers that are lighter in overall weight, provide an increased amount of gripping forces, an increased amount of gripping speeds, as well as an increased amount of gripper control that truly provides dexterous manipulation over that of the levels of operational performance delivered by conventional grippers. There is also a need for soft robot gripper technology to provide a gripper with an increased amount of degree of freedom (DoF) movements within the gripper operational movement space (i.e. analogous to motions of a human finger when writing cursively), a higher amount of quality positioning (i.e. biologically analogous to proprioception) and a high level of force (biologically analogous to muscle effort) feedback.

SUMMARY

The present disclosure relates to soft robotic tentacle system, and more particularly to independently actuated tentacles by transmission system having upper cables extending through lower spacer pathways through transfer channels to upper ring pathways that uniquely provide minimum cable transmission friction, while the tentacles include near-full or full actuation to move objects within a workspace.

Some embodiments of the present disclosure include a soft robot gripper with mechanical structural designs having coordinated tentacle gripping actions with 12 degree of freedom (DoF), to grip/grasp target objects in a precise dexterous manipulation that is safe and controllable. At least one realization gained from experimentation is that multiple tentacle systems need to be light weight in design, strong in terms of durability to withstand longtime operational wear and tear, to meet today's industrial application gripper performance levels.

For example, different types of experimental conventional gripper designs were constructed and tested including pneumatic grippers, hydraulic grippers, electromagnetic motor grippers, and the like, under industrial like applications. What was learned is that these test grippers lack the levels of performance to meet many of today's gripper applications. Some gripper problems that were identified and need to be overcome included: (a) gripper was too heavy, (b) low amount of durability, poor longtime operational wear and tear; (c) slow gripping performances times, in terms of an amount of time the grippers clasped a target object; and (d) high amount of maintenance costs, among other issues. Thus, no further testing was continued for these types of experimental conventional gripper configurations. More experimental testing followed, but with new test grippers designed to overcome the above noted problems along with other advantages.

Some of the embodiments of the present disclosure include grippers or tentacles designed with each tentacle constructed with lower and upper elastic tubes or members connected by an elastic connector. The lower and upper elastic tubes can be the same length and diameter with guide discs attached along a length inside of each tube to maintain spacing between the guide discs. The guide discs can be constructed the same, and each guide disc includes an outer ring with passthrough holes, and a spacer positioned in a donut hole of the ring that also has passthrough holes. Both the ring and spacer passthrough holes collectively define cable pathways. Wherein fillets are configured into the transfer channel entry and exit apertures, the lower and upper connector center thru-holes, the lower and upper ring passthrough holes, the lower and upper spacer passthrough holes and guide ring thru-holes. Further, one or more guide discs can include a convex bottom and top surfaces and rounded peripheral edges or convex edges. Another aspect of the guide rings is that some guide rings can be constructed so that material forming the guide rings has a different stiffness than a stiffness of material forming the spacers.

Contemplated is that the lower and upper elastic tube lengths may be different sizes and different diameters (see FIGS. 1A-1E), and the guide discs can be different thicknesses and diameters (see FIGS. 2D-2I), all of which depends on operational requirements and performance requirements by a user.

The elastic connector is configured with a center thru-hole through an entire length of the connector, and transfer channels are designed to be in a center portion of the connector (see FIG. 1F). Each transfer channel can include a geometric feature having an entry aperture with a cable entry path tangential to an inner surface of the center thru-hole, and an exit aperture with a cable exit path parallel to a center axis of the connector. Such that the entry and exit apertures of the geometric feature are approximately aligned with upper ring passthrough holes of the upper elastic tube and lower spacer passthrough holes of the lower elastic tube.

Wherein the geometric feature (see FIGS. 2A-2C) is based upon a mathematical formula that optimizes the configuration of the transfer channel configuration with the center thru-hole to result in a minimization of an amount of side load on a cable generated from operational motion of the cables, and concurrently minimizes an amount of transmission friction and an amount of cable flex fatigue during an operation of the tentacle gripper. During testing for constructing the connector of the present disclosure, at least one realization realized is that the spacer passthrough holes of the lower elastic tube needed to be designed to align with the entry apertures of the transfer channel of the geometric feature of the connector, and the exit apertures of the transfer channels needed to aligned with the upper ring passthrough holes. As a result, and based on further connector testing of the cable entry path, the cable entry path is configured to extend at an acute angle from a bottom surface to a top surface of the elastic connector, and the cable exit path to constructed to extend at an acute angle from the top surface to the bottom surface.

In order to move the tentacles, cables are driven by motors or actuators. Wherein the cables have proximal ends coupled to motors or actuators outside of the lower and upper elastic tubes or members that extend from the actuators through apertures of a controllable palm baseplate located at a proximal end of the lower elastic tube. A set of lower cables extend through the lower ring passthrough holes of the lower elastic tube and couple to a distal lower guide disc. A set of upper cables extend through the lower spacer passthrough holes of the lower guide rings, through the transfer channels of the connector, to the upper ring passthrough holes to couple to a distal upper guide ring. Wherein an end cap is attached to the distal end of the upper member.

The innovative tentacle design(s) of the present disclosure with the 12 degree of freedom (DoF), provide for a wide variety of gripping styles resulting in an increased ability to grasp objects of different sizes, weights, and shapes. Some specifications associated with the gripper system of the present disclosure can include: (a) grasping objects with ODs from about 40 to 95 mm or 35 to 75 mm, with an opposing finger gap of about 63.5 mm; (b) a cycle time of 88 msec to close and 166 msec to open; (c) a grip force of about 2.5 lb per finger; and (d) wherein most embodiments meet requirements of FDA-CFR Title 21 for food-contact materials and is rated IP67 protection class, as well as operate at decibels of below 85-dB. The above specific tentacle gripper performance specifications provide substantial amount of levels of higher performance surpassing today's gripper industry performance expectations when compared to the test conventional grippers amount of levels of gripper performance specifications test under some of today's gripper industrial applications.

For example, the new tentacle design in combination with other tentacles can grasp irregular shaped objects including inorganic irregular shaped objects (rocks, manmade objects) and organic irregular shaped objects (unprocessed raw fruit, processed foods, bake foods, non-baked foods, animal products (meat, eggs, cheese). The different types of shaped objects the innovative multiple tentacles can transport include, by-non-limiting example, 3-dimensional (3D) shapes that are the same or similar to include: (a) polyhedral shapes, which are shapes with flat faces; (a) ellipsoids, which are egg-shaped; (c) sphere-shaped objects; (d) cylinders; and (e) cones. A shape can be understood as a form of an object or the objects external boundary, outline, or external surface, as opposed to other properties such as color, texture or material type. Most of the test conventional grippers tests were not able to grasp the above irregular shaped objects, and/or if they were able to grasp the object caused damage to the objects or continually dropped the objects.

Embodiments of the present disclosure are designed to grasp and move organic shapes often found in nature. For example, these organic shapes that can be grasped can be more free-flowing and less symmetrical objects, such as leave shapes, rock shapes and cloud shapes. Other grasped objects by the innovative tentacles can include abstract shapes including cubes, cylinders, triangles as well as organic shapes such as rocks, fruit, sponges, can be represented by generalized shape methods such as point clouds. Some of the different aspects of the gripping capabilities of the innovative tentacles include a level of grasping non-rigid objects, such bendable and deformable object that can include: (a) bags filled with small objects, i.e. bolts, gromets, etc.; (b) wrapped perishable items; (c) fragile items, such as sushi, baked goods, or other fragile items, when compared to a level of versatile gripping action associated with deformable objects to existing conventional soft robotic technologies. Experimentation of the innovative tentacles showed a higher level of precise dexterous manipulation with an increased performance level when operating with unprotected and untrained humans in completing an interactive human/robot task in an industrial manufacturing environment, i.e. illustrating an injury free industrial application with humans.

What was later realized after some experimentation is that the innovative multiple tentacles having such dexterous manipulation can be used with motors such as radio control (RC) servos and tension cables with a +/−120° of flex range per tentacle section that can be manipulated via a centralized control system. The RC servos and tension cable construction of some embodiments include an axial lift strength in excess of 100 N (i.e. lifting strength greater than >10 kg). At these axial lift strength levels of gripping strength when compared to an overall lighter weight tentacle translates into a high tentacle gripping strength to weight ratio, i.e. the tentacle construction is substantially lighter when compared to conventional grippers of the same size. Having a high amount of tentacle grip strength to weight ratio realizes into an increased tentacle grip strength capability to move heavier objects in a shorter amount of time when compared to conventional grippers of the same size having a low amount of tentacle grip strength to weight ratio.

After many long operation test periods operating the tentacles under various gripper industrial applications, observed was that the tentacles had no heat dissipation problems with the RC motors. Whereas under similar long operation test periods with the experimental conventional gripper systems there were observed problems with heat dissipation with the RC motors that resulted a limiting of an overall gripping strength.

At least one surprising attribute observed after long operation test periods was a decrease in an amount of grasping time to move a target object from a start position to a final position, when compared to an amount of grasping time of conventional grippers to grasp and to move the same object from the same start position to the same final position. Also observed is that the RC servomotors and tension cables required fractional seconds of time to actuate forces, when compared conventional electromagnetic motor grippers. At least one reason that the conventional grippers were very slow is believed due to an amount of take-in time for the geared units. Other problem areas that were observed included weak grip strengths by the conventional electromagnetic motor grippers, this may have been as a result of heat dissipation with the RC motors, as noted above from previous test experiments.

Another realization observed from a test human-robot co-task completion application, were reports from the human workers that because of the high dexterous manipulation of the tentacles, the unprotected and untrained humans felt confident while completing an inter-active human/robot task in an industrial manufacturing environment that they had little concerns of the tentacles injuring them. Whereas, in contrast, when the same human workers were placed in the same test human-robot co-task completion application with conventional grippers, most of the human workers reported that did not feel safe and believed that they would eventually be injured by the conventional grippers, in part, due to the grippers not having near-full or full actuation and poor dexterous manipulation. These types of conventional gripper have in the past under the same industry applications, proved to be injury prone challenging human safety and human worker confidence.

To solve these conventional safety problems, embodiments of the present disclosure include tentacles constructed with elastic materials to avoid pinch points that are harmful for humans. Included with these precautionary measures for these embodiments is the geometric feature of the elastic connector, as noted above, that connects the lower and upper elastic tubes. The geometric feature minimizes an amount of side load of the cable that is generated from the cables moving during operation, and concurrently minimizes an amount of transmission friction and an amount of cable flex fatigue during an operation of the tentacle gripper. However, just as important is that the geometric feature assists in the tentacle's high dexterous manipulation, and in combination with end tip sensor embedded in the end tips, distal joint sensors, i.e. distributed shape sensors or linear displacement sensors, provide a level of tentacles control resulting in almost 100% injury-free work environment for human workers. Today's industrial manufacturer best practices managers are working with researchers to accomplish such injury-free robot grippers, as stated in Mr. Maurtua et. Al. article "Human-robot collaboration in industrial applications: Safety, interaction and trust", that states "*Human-robot collaboration is a key factor for the development of factories of the future, a space in which humans and robots can work and carry out tasks together. Safety is one of the most critical aspects in this collaborative human-robot paradigm.*" (Published Jul. 7, 2017, Research Article, https://doi.org/10.1177/1729881417716010).

Another advantage of the embodiments of the present disclosure can be that the robot arm mass loading can be reduced by interposing extensions to the cables via flexible sheathed cables such as bicycle brake cables between the base plate of the multi-tentacle gripper and a servo-motor package located and supported external to the robot. Because the flexible sheath cable is not required to flex to allow the tentacles to flex, the lack of flexibility in the flexible sheath does not impact a dexterity of the multi-tentacle gripper. By locating a mass of the servo-motor package off of the robot arm, the mass impact of the gripper is very low for its force and speed, as the prime mover for each degree of freedom is not carried by the robot, but is remote with the force and force feedback carried by flexible sheathed cables.

Also another advantage of the embodiments of the present disclosure is that the tentacles do not need to contain electronics, nor in fact, any requirement for metals or conductors whatsoever; a gripper according to the present disclosure could be made purely of polyurethane, synthetic rubber, or other elastomer plastics, with nylon, aramid (Kevlar) or ultra-high-molecular-weight polyethylene (UHMWPE, UHMW), (Dyneema™ or Spectra™) cables and Delrin™, Nylon, PEEK, Ultem™ (polyetherimide) or fiberglass-reinforced epoxy spacers and rings, and anti-friction bushings (of Nylon, Delrin™, Teflon™) for the spacers and rings. Thus, the embodiments of the present disclosure could be used in environments of extremely high magnetic or electric field intensity, as well as in high RF environments. Further, with no electronics required in the tentacles whatsoever, the gripper could be used in areas of intense ionizing radiation that would destroy semiconductors. An additional element of the present disclosure can be a simple calibration station, composed of a precision, preferably hardened, block of size similar to a distal phalange, equipped with axis force gauges, rigidly positioned at a known location in the frame of reference of the system, and with an optional video camera.

According to an embodiment of the present disclosure, a device including tentacles, each tentacle includes lower and upper elastic members connected by an elastic connector. Each elastic member includes guide discs, and each guide disc includes a ring with passthrough holes, and a spacer located in a donut hole of the ring that has passthrough holes, while the ring and spacer passthrough holes collectively define cable pathways. Wherein the elastic connector includes a center thru-hole and transfer channels in a center portion. Cables having proximal ends coupled to actuators outside of the lower elastic member extend from the actuators through apertures of a controllable palm baseplate located at a proximal end of the lower elastic member. A set of lower cables extend through the lower ring passthrough holes to couple to a distal lower guide disc. A set of upper cables extend through the lower spacer passthrough holes, through the transfer channels to the upper ring passthrough holes to couple to a distal upper guide ring, and an end cap is attached to the distal end of the upper member.

According to another embodiment of the present disclosure, a gripper device including tentacles, each tentacle includes lower and upper members connected by a connector. Each member has guide discs attached along the member to maintain spacing between the guide discs. Each guide disc includes a ring with passthrough holes, and a spacer located in a donut hole of the ring that has passthrough holes, while the ring and spacer passthrough holes collectively define cable pathways. Wherein the connector includes a center thru-hole and transfer channels in a center portion. Each transfer channel includes a geometric feature having an entry aperture with a cable entry path tangential to an inner surface of the center thru-hole. An exit aperture with a cable exit path parallel to a center axis of the connector. Cables having proximal ends coupled to actuators outside of the lower member that extend from the actuators through apertures of a controllable palm baseplate located at a proximal end of the lower member. Such that a set of lower cables extend through the lower ring passthrough holes to couple to a distal lower guide disc. A set of upper cables extend through the lower spacer passthrough holes of the lower guide rings, through the transfer channels to the upper ring passthrough holes to couple to a distal upper guide ring. Wherein an end cap is attached to the distal end of the upper member.

According to another embodiment of the present disclosure, a soft robotic gripper system including tentacles, each tentacle includes lower and upper members connected by a connector. Each member has guide discs attached along the member to maintain spacing between the guide discs. Each guide disc includes a ring with passthrough holes, and a spacer located in a donut hole of the ring that has passthrough holes, while the ring and spacer passthrough holes collectively define cable pathways. Wherein the connector includes a center thru-hole and transfer channels in a center portion each transfer channel includes a geometric feature having an entry aperture with a cable entry path tangential to an inner surface of the center thru-hole, and an exit aperture with a cable exit path parallel to a center axis of the connector. Cables having proximal ends coupled to actuators outside of the lower member that extend from the actuators through apertures of a controllable palm baseplate located at a proximal end of the lower member. A set of lower cables extend through the lower ring passthrough holes to couple to a distal lower guide disc. A set of upper cables extend through the lower spacer passthrough holes of the lower guide rings, through the transfer channels to the upper ring passthrough holes to couple to a distal upper guide ring, wherein an end cap is attached to the distal end of the upper member. A centralized control system is configured to receive tentacle data and sensor data from a transceiver. Compare stored object configurations to obtain a corresponding stored object configuration using the sensor data. Compare stored commands to obtain stored sets of commands corresponding to the stored object configuration. Compare stored tentacle actions associated with the stored object configuration to obtain a corresponding stored set of tentacle actions using the received tentacle data. Compare the stored sets of commands to obtain a corresponding first set of commands, if the tentacle actions from the tentacle data do not correspond to the stored object configuration, then select a second set of commands. Generate a sequence of control signals that cause motors for each tentacle of the tentacles to apply a sequence of tensions to transmission systems to each tentacle, to move the TO, according to the selected set of commands associated.

According to another embodiment of the present disclosure, a soft robotic gripper system including tentacles, each tentacle includes lower and upper members connected by a connector. Each member has guide discs attached along the member to maintain spacing between the guide discs. Each guide disc includes a ring with passthrough holes, and a spacer located in a donut hole of the ring that has passthrough holes, while the ring and spacer passthrough holes collectively define cable pathways. A connector includes a center thru-hole and transfer channels in a center portion each transfer channel includes a geometric feature having an entry aperture with a cable entry path tangential to an inner surface of the center thru-hole, and an exit aperture with a cable exit path parallel to a center axis of the connector. Cables having proximal ends coupled to actuators outside of the lower member that extend from the actuators through apertures of a controllable palm baseplate located at a proximal end of the lower member. A set of lower cables extend through the lower ring passthrough holes to couple to a distal lower guide disc. A set of upper cables extend through the lower spacer passthrough holes of the lower guide rings, through the transfer channels to the upper ring passthrough holes to couple to a distal upper guide ring, wherein an end cap is attached to the distal end of the upper member. A centralized control system is configured to receive tentacle data and sensor data from a transceiver. Compare stored object configurations to obtain a corresponding stored object configuration using the sensor data. Compare stored commands to obtain stored sets of commands corresponding to the stored object configuration. Compare stored tentacle actions associated with the stored object configuration to obtain a corresponding stored set of tentacle actions using the received tentacle data. Compare the stored sets of commands to obtain a corresponding first set of commands, if the tentacle actions from the tentacle data do not correspond to the stored object configuration. Then, select a second set of commands, wherein the selected set of commands includes a sequence of predetermined torques to be applied to one or more joints or flexural joints along with corresponding tensions to apply to a plurality of transmission systems of each tentacle of the tentacles. Such that each transmission system has a first end connected to a motor and a second end connected to a joint or a flexural joint. Generate a sequence of control signals that cause motors for each tentacle of the tentacles to apply a sequence of tensions to transmission systems to each tentacle, to move the TO, according to the selected set of commands associated. Wherein, the selected set of commands includes a sequence of predetermined torques to be applied to one or more joints or flexural joints along with corresponding tensions to apply to a plurality of transmission systems of each tentacle of the tentacles. Such that each transmission system has a first end connected to a motor and a second end connected to a joint or a flexural joint.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1D is a schematic illustrating the cable configuration for the lower tube rings and spacers of the soft robot gripper of FIG. 1A and FIG. 1B, according to some embodiments of the present disclosure;

FIG. 1E is a schematic illustrating the cable configuration for the upper tube rings and spacers of the soft robot gripper of FIG. 1A and FIG. 1B, according to some embodiments of the present disclosure;

FIG. 2A, FIG. 2B and FIG. 2C are schematics illustrating an optimization of elastic connector that minimizes cable friction and cable material fatigue, FIG. 2A illustrates side views of the cable pathways, and FIG. 2B illustrates an oblique view of FIG. 2A, and FIG. 2C shows a top view of FIG. 2A, according to embodiments of the present disclosure;

FIG. 2D is a schematic illustrating a tope view of a guide disc having pathways and a thru-center hole with a rounded peripheral edge or convex edge, in order to minimize friction and wear to the elastic tube, according to some embodiments of the present disclosure;

FIG. 2E is a schematic illustrating an oblique view of a guide disc having pathways and a thru-center hole with fillets to minimize cable friction and material fatigue when the cable is in motion, along with a rounded peripheral edge or convex edge, in order to minimize friction and wear to the elastic tube, according to some embodiments of the present disclosure;

FIG. 2F, FIG. 2G and FIG. 2H are schematics illustrating side views of a guide disc having pathways and a thru-center hole along with a rounded peripheral edges or convex edges, in order to minimize friction and wear to the elastic tube, according to some embodiments of the present disclosure;

FIG. 2I is a schematic illustrating side views of varying sized guide discs with pathways and thru-center holes and rounded peripheral edges or convex edges positioned within an elastic tube, according to some embodiments of the present disclosure;

FIG. 6B is a schematic illustrating a table of gripping strength test results for a test gripper having three tentacles, two sections per tentacle, having fully actuated (12 DoF), +/−1200 flex per tentacle section, and 30 mm minimum interior flex radius, the tested gripping strengths include grasp load capacity, initial and maximum current draws, and failure modes determined for several grasps, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to robot manipulators, and more particularly to soft robotic grippers having multiple independently actuated tentacle grippers with centralized control coordinating the multiple tentacles that have near-full or full actuation to move objects.

Figure 1B:
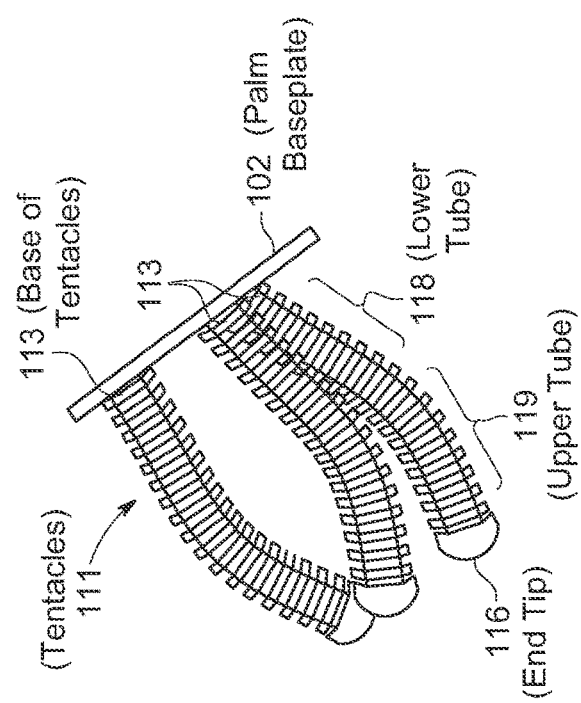
FIG. 1B is a schematic illustrating the tentacles of the soft robot gripper of FIG. 1A, according to some embodiments of the present disclosure.
Figure 1A:
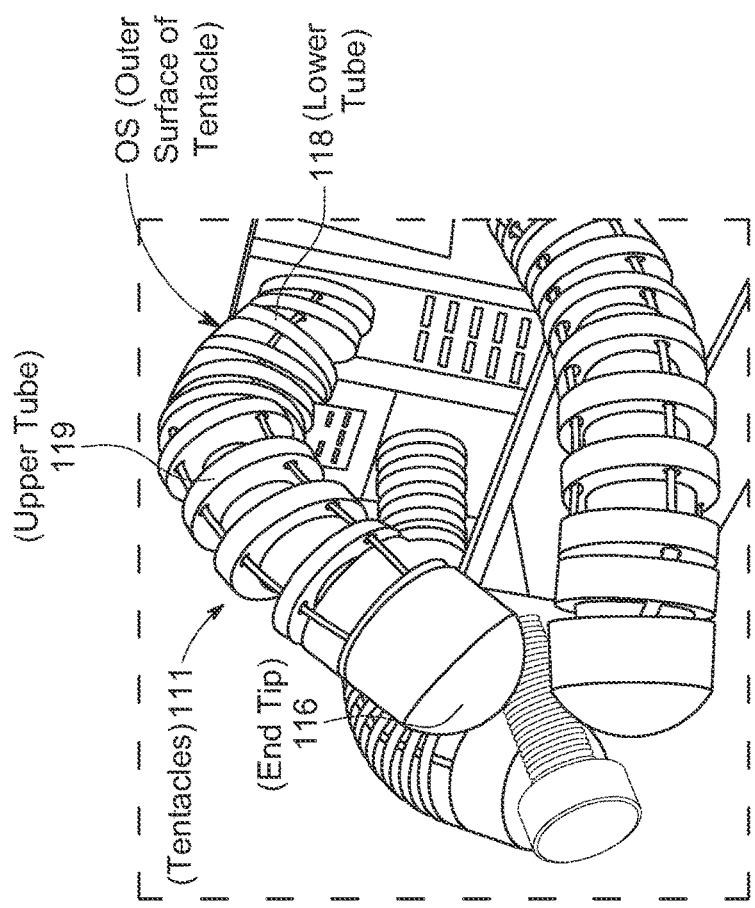
FIG. 1A is a picture illustrating the tentacles of the soft robot gripper, according to an embodiment of the present disclosure.

FIG. 1A is a picture illustrating multiple tentacles 111 of the soft robot gripper, according to an embodiment of the present disclosure. Each tentacle 111 includes a lower tube 118, an upper tube 119 and an end tip 116. Contemplated is that each tentacle 111 can have individual lengths, widths (radius), or both, to provide a unique grasping type, if a user requires such tentacle configuration for an application.

Contemplated is that one or more portions or the entire outer surface OS of the tentacles 111 can be configured to include at least one low friction material such as a polymer to reduce a level of coefficient of friction between the outside surface OS of the tentacles 111 and the gripped object, and thereby reduce a gripper's maximum frictional grip strength. Experimentation later taught that by coating one or more portions of the outer surfaces OS of the tentacles 111 with compatible material, especially a high friction elastomer material(s), i.e. Tool Dip™, resulted in restoring the desirable high coefficient of friction on the gripping surface.

FIG. 1B is a schematic illustrating the tentacles 111 of the soft robot gripper of FIG. 1A, according to some embodiments of the present disclosure. Wherein a palm baseplate 102 is located at the tentacle base 113 of the tentacle 111, such that the palm baseplate 102 contacts the tentacle base 113 of the lower tube 118, wherein the upper tube 119 includes the end tip 116.

Referring to FIG. 1A and FIG. 1B, contemplated is that outer surfaces OS of FIG. 1A of the multiple tentacles 111 and palm baseplate 102 can uniquely be designed per user application. For instances the object may include one or a combination of: non-uniform or uniform shapes, different levels of deformability, different levels of flexibility, different levels of strength, size, sensor loadout, chemical resistance, frictional characteristics, texture, etc. These different types of objects present challenges for conventional gripper systems to grasp or move the object, which creates a need to discover new tentacle structures to overcome these challenges. Some embodiments of the present disclosure have been designed to have outer surfaces OS of the tentacles 111 and palm baseplate 102 to overcome these challenges where the conventional gripper systems have failed Each of the innovative tentacle 111 and palm baseplate 102 designs are configured to provide unique gripping surfaces specifically directed to enhance a level of grasping and a level of moving an object for the different types of above noted challenges, when compared to a level of conventional gripper grasping the same object. Some unique gripping surfaces can include outer surfaces with one or a combination of dimples, protrusions, a surface portion having a degree of rough surface and smooth surface, shaped extensions (such as rods, levels, etc.), designed 2D or 3D configuration, different design patterns of dimples or protrusions or both. Further, some outer surface designs can have one or patterns of ridges, rough surfaces, different shaped ridges/bumps/divots, etc., that can be structure to enhance one or a combination of a level of grasping force/power, grasping grip, etc.

Figure 1C:
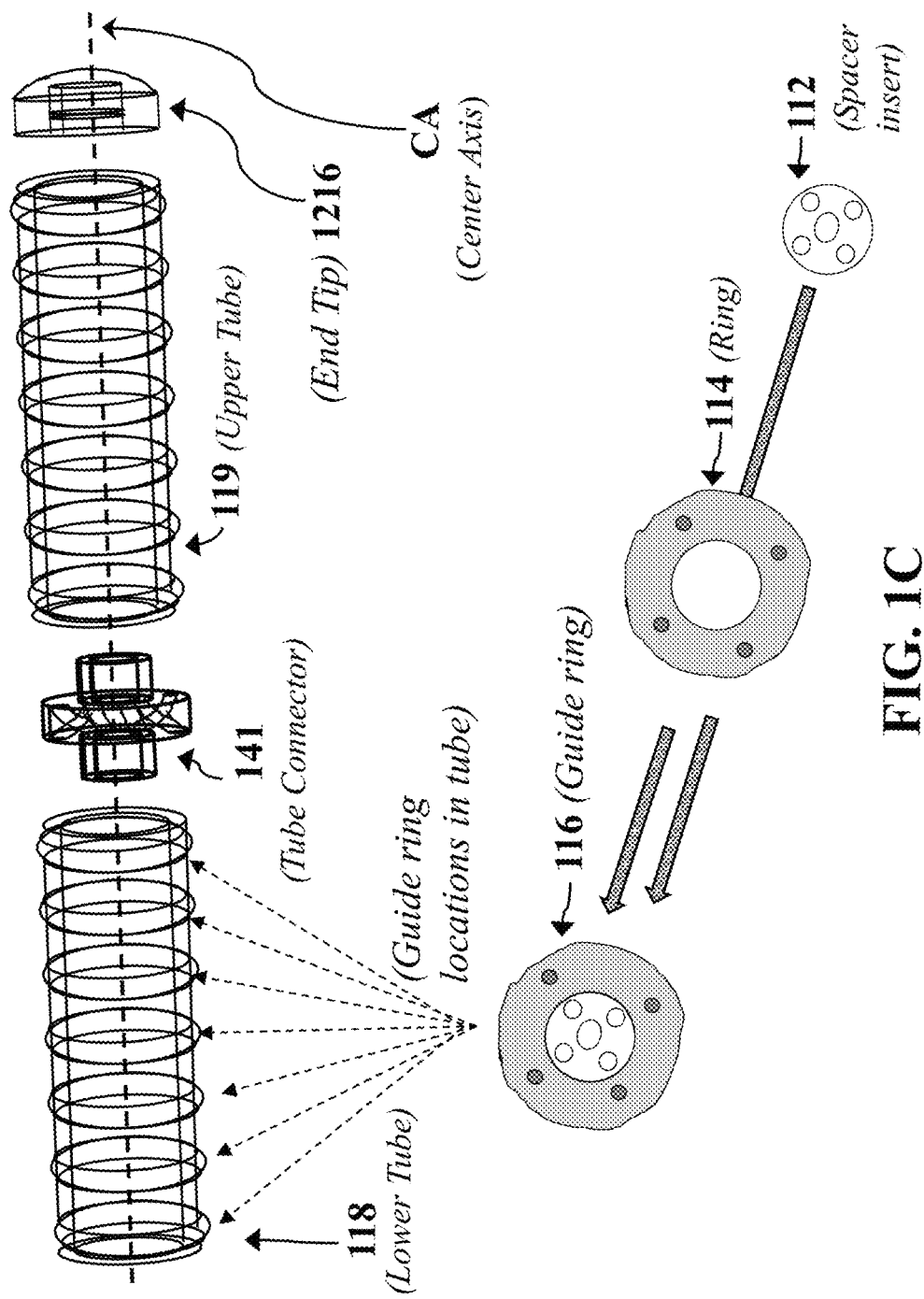
FIG. 1C is a schematic illustrating some components of the soft robot gripper of FIG. 1A, according to some embodiments of the present disclosure.

FIG. 1C is a schematic illustrating some components of the soft robot gripper of FIG. 1A, according to some embodiments of the present disclosure. For example, a spacer 112 is positioned in a center of a ring 114 resulting in a guide ring 116. The lower tube 118 and the upper tube 119 both include guide rings 116 along a center axis CA. The lower tube 118 and the upper tube 119 are joined by a tube connector 141, wherein the upper tube 119 has an end tip 116 fastened to a distal end of the upper tube 119.

An aspect of each tentacle is that sensors (not shown) can be implemented along the lower tube 118, tube connector 141, upper tube 119 and end tip 116. For example, contemplated is that the spacer 112, ring 114 and end tip 116 can have imbedded sensors (not shown). Some types of sensors, by non-limiting example, can include also include real time sensor, such that the sensor can include: (a) a level of cable tension force; (b) a level of movability of the cables; (c) an operational wear sensor for the cables, frayed or broken cable strands, etc.; (d) an angular rotation measurement; (e) a pressure sensor; (f) force sensor; (g) temperature; (h) moisture; (i) coefficient of friction sensor; (j) electrical surface conductivity sensor, i.e. so as to determine if object is leaking a fluid, such as juices from meat, melting fluids from nominally frozen objects, or other fluids from the workspace environment (i.e. water, oil, grease, solvent, deposits from smoke and dust, etc.). These sensors can provide data to provide a level of a measured sensitivity back to the soft robot gripper system (i.e., robot control computer 362, control module 360, sensor control 373, tentacle sensors 366, etc. of FIG. 3E), for aspects associated with operational, management, maintenance or some other concern associated with the system 300G of FIG. 3G or any component or other system that the gripper system may be integrated into. Further, the sensors can be configured to generate sensor data that can be applied to a tentacle state function to determine a state of the tentacle. Also, the end tip 116 can include sensor(s) of one of an inertial sensor, a micro electro-mechanical system device, an accelerometer, a magnetometer, a tactile sensor, and an electromagnetic positional tracker.

Some embodiments can be configured with distal joint sensors implemented into a joint for each tentacle or a distal joint of each tentacle. The term "joint" can include hinge-type joints, ball-and-socket joints, sliding rail joints, rotational wheel-like joints, and elastomeric flexible joints such as the flexible lower tube 118 and upper tube 119. The joint sensors can be configured to generate data, the data can be applied to a joint state function, so as determine a state of the distal joint, wherein the distal joint sensors may be of a type that are distributed shape sensors or linear displacement sensors. Wherein the linear displacement sensors provide data for cables associated with the distal joint, such that each linear displacement sensor provides data so as to determine a distance that a cable transmission moves, and upon determining the distances for all the cables via the linear displacement sensor, the distances for all the cables is indicative of movement of the distal joint. Further, each linear displacement sensor can include one of a linear voltage differential transformer, a Hall effect sensor and a magnet, a slide potentiometer, a reference element coupled to the cable transmission at a reference point, so as to measure movement of the reference element as an indication of movement of the cable transmission. Contemplated is a actuator cable wear sensing sensor using measurement of the electrical resistance of the actuator cable when the gripper is not gripping an object to detect actuator cable wear, and the same actuator cable resistance measuring sensor to use the cable as a strain gauge resistance element to measure gripping force when gripping an object. Further, sensor data can be environmental sensors located approximate the tentacles, or sensors such as cameras, video cameras, speed sensors, light sensors, distance sensors or depth sensors.

FIG. 1D is a schematic illustrating the cable configuration for the lower tube spacer & rings 116 of FIG. 1C of the soft robot gripper of FIG. 1A and FIG. 1B, according to some embodiments of the present disclosure.

Referring to FIG. 1C and FIG. 1D, the lower tube rings 114 of FIG. 1C include cable pathways and cables A1, A2, A3, A4 of FIG. 4D that control flexure of the lower tube 118 of FIG. 1C, and the lower tube spacers 112 of FIG. 1C include cable pathways and cables D1, D2, D3, D4 of FIG. 12D that do not alter flexure of the lower tube 118 of FIG. 1C but will offer flexure of the distal upper tube 119 of FIG. 1C. Wherein the pathway D9 of FIG. 1D and E9 of FIG. 1E can be used for central wiring associated with sensors in the upper tube 119 of FIG. 1C, lower tube 118 and end cap 116 of FIG. 1C.

FIG. 1E is a schematic illustrating the cable configuration for the upper tube guide ring of the soft robot gripper of FIG. 1A and FIG. 1B, according to some embodiments of the present disclosure. Referring to FIG. 1C and FIG. 1E, the upper tube 119 of FIG. 1C have guide rings 116 with cable pathways F1, F2, F3, F4 for cables which control flexure of the upper tube 119 of FIG. 1C (i.e. the cables actuate the upper tentacle section and terminate at a distal guide ring of the upper tube approximate cable pathways F1, F2, F3, F4). Wherein the upper tube spacers 112 can include cable pathways E1, E2, E3, E4 that can provide pathways for to a second connector attached to a third tube section. Further, the center hole E9 can be utilized for wiring for sensors or for some other action device that can provide data associated with the end cap 116 of FIG. 1C.

Figure 1F:
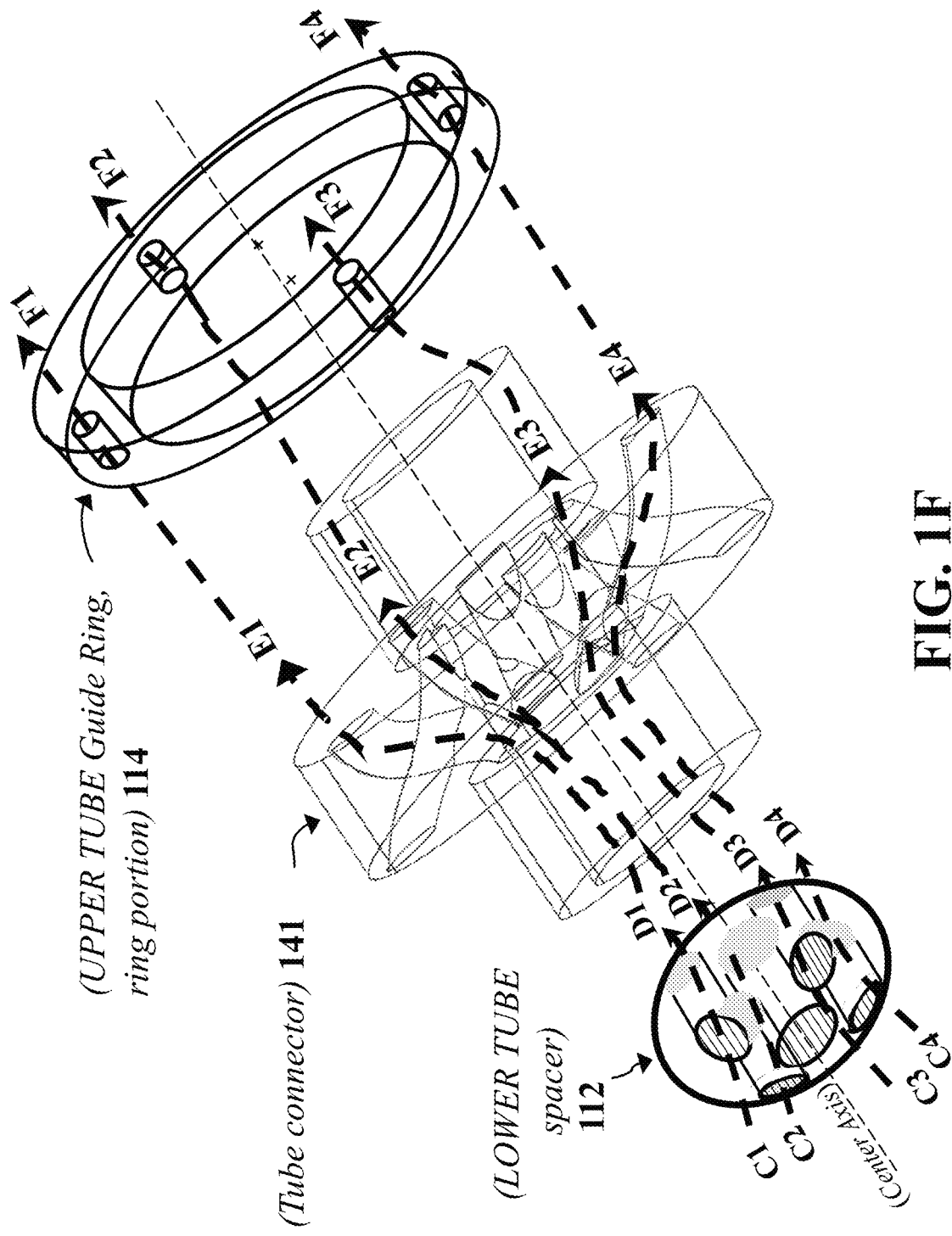
FIG. 1F is a schematic illustrating the cable configuration starting from entering a distal guide disc lower tube spacer (C1-C4) coming from the controllable palm baseplate of FIG. 1B toward the end tip of FIG. 1B, exiting the lower tube spacer pathways and entering the tube connector via a center thru-hole (D1-D4), through the transfer channels and exiting the transfer channels of the tube connector and entering the upper tube ring pathways (E1-E4), and exiting the upper tube ring pathways (F1-F4), according to some embodiments of the present disclosure.
Figure 3A:
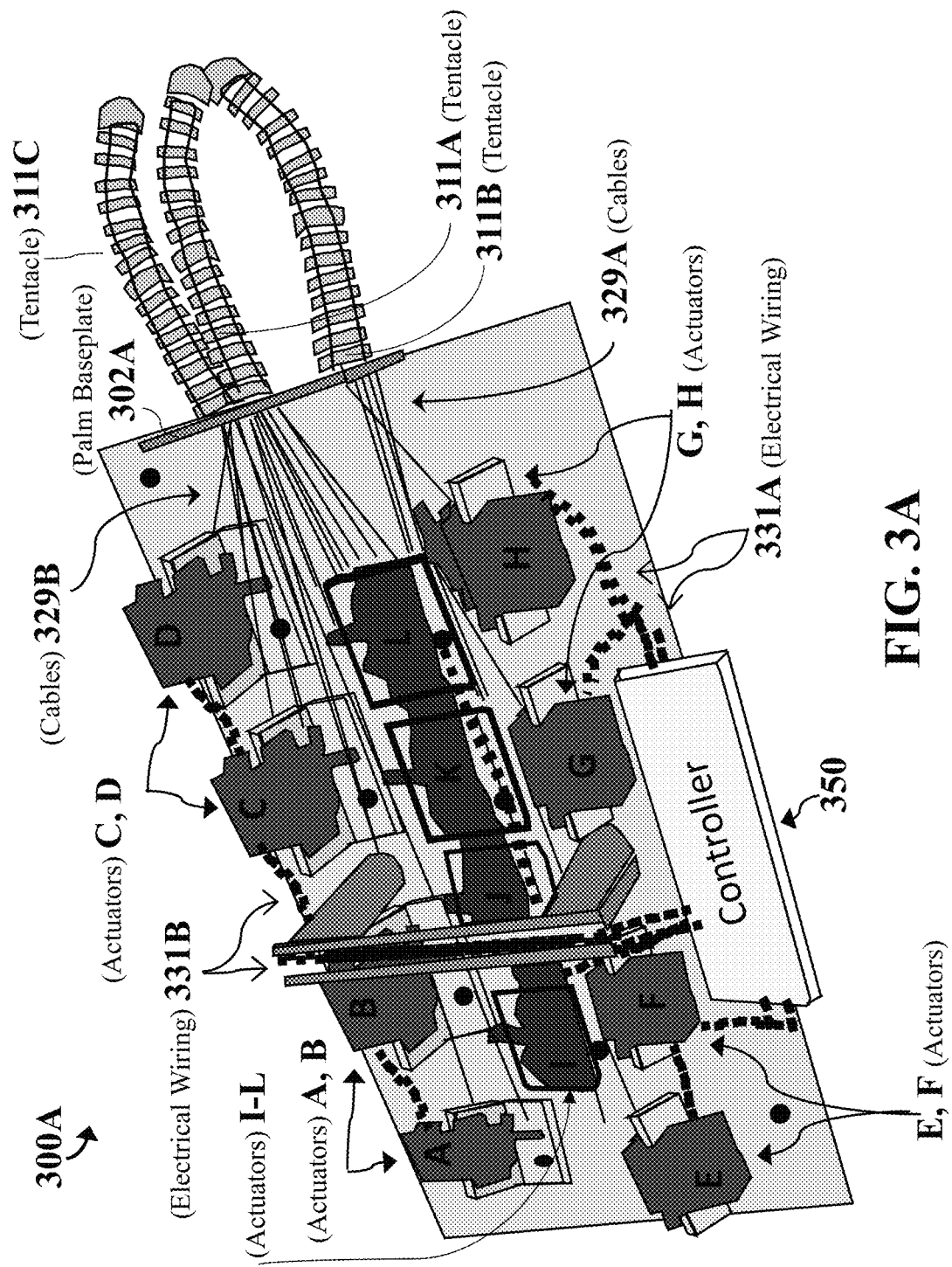
FIG. 3A is a schematic illustrating a soft robot tentacle gripper system, according to some embodiments of the present disclosure.

FIG. 1F is a schematic illustrating the cable configuration exiting from a distal guide ring of the lower tube spacer 112 (C1-C4), wherein the cables are fixed to actuators A-L of FIG. 3A, extend through apertures of the palm baseplate of FIG. 3A, into pathways of the lower tube spacers 112 and enter the tube connector 141 (D1-D4), exit the tube connector 141 (E1-E4), enter the upper tube guide ring portion 114 (E1-E4), and exit the upper tube guide ring-ring section 114 (F1-F4), according to some embodiments of the present disclosure.

At least one realization included separating the lower tube cable-controlled transmission system from the upper tube cable-controlled transmission system. Observed from experimentation was that the lower and upper cable-controlled transmission systems had an almost frictionless motion of the tentacles' cable transmission mechanism. Wherein the lower 118 and upper tube 119 sections and tube connector 141 had a minimum bend radius and no kinking or otherwise constrained motion that was observed. However, in order to come to the above realization there were many prior failed test experiments, which many aspects were learned. For example, some failed test designs positioned the lower and upper cables together in single channel or hole, which resulted in very high friction levels and very poor bending performances. Another failed test design placed the lower cables in one hole in the lower tube and the upper cables positioned in another single hole in lower tube, where the upper cable transitioned through the center thruhole of the connector, and into upper guide rings that included individual pass thru-holes for each upper cable for the upper tube. However, these failed test designs also demonstrated very high friction levels and very poor bending performances. Thus, gained from these failed test designs was that at least one challenge to overcome in developing the embodiments of the present disclosure required figuring out how to separate the lower cable transmission system from the upper cable transmission system?

Still referring to FIG. 1F, eventfully what was later discovered is that even if there is sufficient physical space in the hole for the cables to run together, as soon as tension was applied to the cables and the tentacle flexed, an negative effect was produced where the cable tension pulled all the cables to one side of the hole, resulting in the cables rubbing on each other. Even though the cables were coated in nylon or uncoated or using smooth steel cables, observed was a very high coefficient of friction that the cables effectively stuck together, causing an unacceptable friction induced load on the servomotors, that resulted in poor performance and other negative effects to the test system. Also observed is that some cables would become slack, then looped underneath a second cable, and when that second cable was subsequentially tensioned, resulted in the first cable being locked in position, causing a negative effect to the tentacle, and some cases failed gripper operation.

Other realizations later gained included designing pathway holes for each cable in both the spacer 112 and ring 114 of the guide ring 116 that allowed for improved tentacle performances with faster actuation, minimum friction, and a minimum an amount of load on the servomotors. Another innovative feature incorporated into the innovative guide rings for some embodiments include using low coefficient of friction materials for the spacers and the rings, i.e. materials including a very low coefficient of friction when placed approximate cables either uncoated or coated. Observed from test experiments was an increase level of performance and an increased tentacle grip strength in very tight tentacle curvature positions/applications. At least one reason for the improved tenable grip strength is believed due to the spacer and ring cable pathways, which provided for the reduced coefficient of friction, when compared to conventional cabling designs and configurations for conventional gripper systems of the same size. Contemplated is that a material type for the spacer and rings can be chosen per application requiring one or more of a higher coefficient of friction type material(s), a higher level of friction durability type material(s), a higher strength type material(s), low weight type of material(s). Also contemplated is that a small or minimum size bushing or bearing could be used as insert between the spacer or ring and the cable, wherein the bushing/bearing could be designed to have a certain level of coefficient of friction material(s), which could be determined by operator's intended required operational goals.

Still referring to FIG. 1F, also learned from experimentation is that test cables encased in sheaths such as bicycle brake cables and the like, were observed insufficient levels of flexibility, poor performance levels and failed to meet the flexible performance goals of the present disclosure.

Figure 2A:
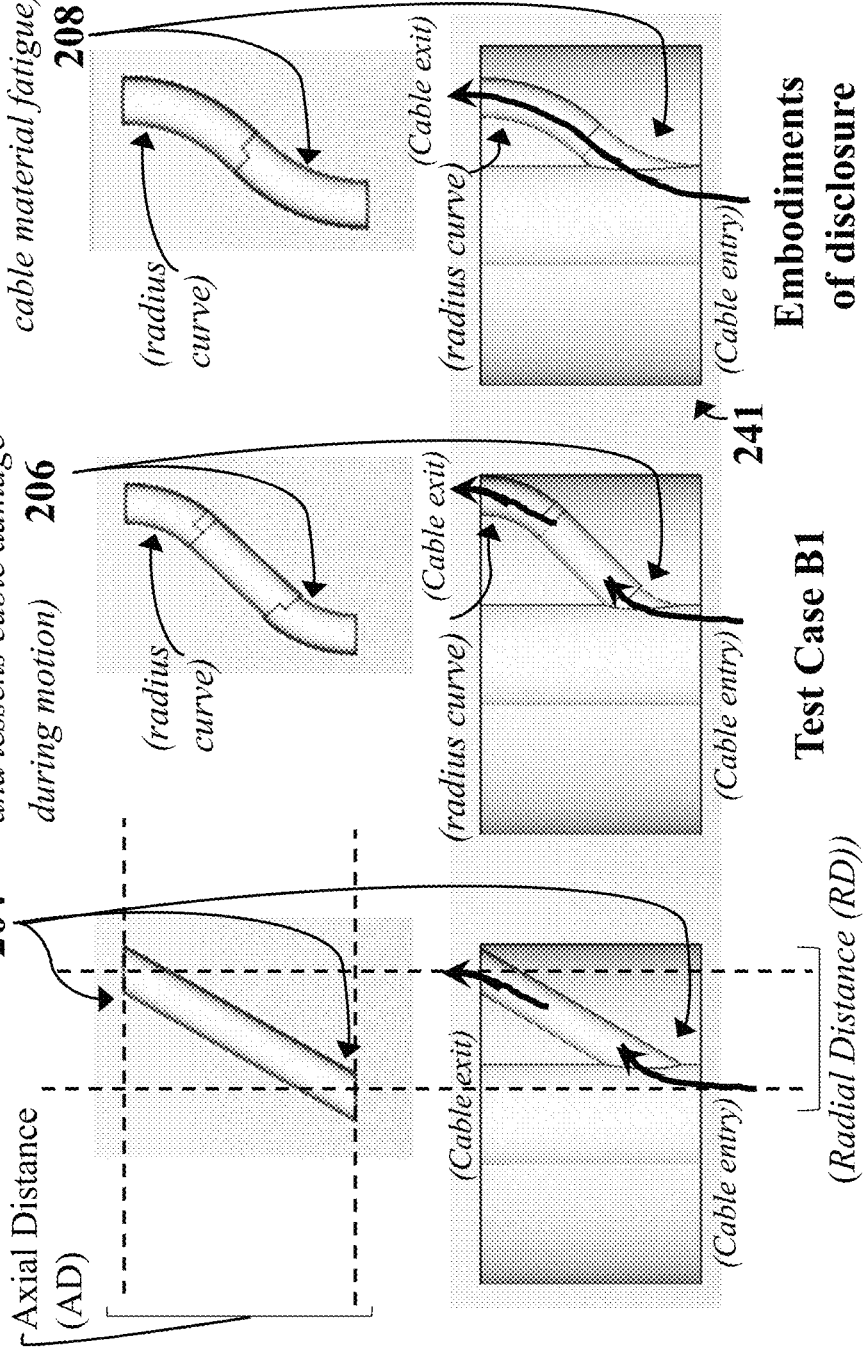

FIG. 2A, FIG. 2B and FIG. 2C are schematics illustrating test experiments of transfer channel configuration, resulting in an optimization transfer channel for the elastic connector 241 which minimizes cable friction and cable material fatigue, according to embodiments of the present disclosure. FIG. 2A illustrates side views of the test cable pathways 204 and 206 of failed test pathways, and a side of the innovative cable pathways used for the embodiments of the present disclosure 208 for the elastic connector 241, and FIG. 2B illustrates an oblique view of FIG. 2A of the failed cable pathways and innovative pathways, and FIG. 2C shows a top view of FIG. 2A.

Regarding manufacturing of the elastic connector 241, test case A1 & A2 can be manufactured with a simple drill bit, however, such channel configurations resulted in sharp angled corners 204, 214 of FIG. 2A and FIG. 2B, with a high amount of cable friction that caused damage to the cable material during cable motion. Due to the high amount of cable friction and damage to the cable materials, the test cases A1 & A2 were not desirable for tentacle gripper designs, and thus were not further tested.

Still referring to FIG. 2A to FIG. 2C, test case B1 & B2 incorporated radius curves 206, 216 of FIG. 2A and FIG. 2B at the transfer channel entry and exit apertures. What was learned from testing is that the addition of having the radius curve decreased an amount of cable friction and lessened an amount of cable material fatigue during cable motion. However, in order to incorporate the radius curve required advanced manufacturing techniques such as three-dimensional (3D) printing, or injection molding using cutouts to generate the 3D curve of the preferred transfer channel designed shape. What was later learned upon further testing is that even though the addition of the radius curve lessened the amount of cable friction and cable material damage, the observed amount of cable friction and cable material damage, and cable material fatigue were at levels that failed to provide a sustainable amount of cable friction and cable material performance levels to meet the desired goals, performance aspects and requirements expected for the embodiments of the present disclosure. What was realized from test cases B1 & B2 is that the radius curve needed to be optimized to substantially reduce an amount of flexure of the cable and an amount of cable wear during tentacle motion. Thereby, minimizing an amount of cable material fatigue during operation of the tentacle gripper.

Optimized Transfer Channel Entry/Exit Aperture Cable Pathways

Still referring to FIG. 2A to FIG. 2C, embodiments of the present disclosure include optimized transfer channels based upon a mathematically constructed formula that further increased the radius 208, 218 of FIG. 2A and FIG. 2B of the structural cable pathway design for each transfer channel entry/exit apertures. This formula includes obtaining a measured distance between a passthrough hole of a guide disc, i.e. that a cable exits/enters, to an entry/exiting transfer channel aperture of the elastic connector 241. The reason the distance is measured is to use the measured distance along with a pair of arcs of constant and equal radius, to construct an optimal cable pathway for the entry/exit transfer channel apertures. Such that a maximization of the radius of the pair of arcs within the measured distance, results in a minimization of an amount of side load of the cable generated from a motion of the cables, and concurrently minimizes an amount of transmission friction and an amount of cable flex fatigue during an operation of the tentacle gripper Optimum Cable Pathway Formula The formula for constructing the optimal cable pathway depends upon the axial distance (AD) of FIG. 2A between the entry/exit apertures measured lengthwise along the tentacle and the radial distance (RD) of FIG. 2A between the entry/exit apertures measured parallel to the long axis of the tentacle. The optimal cable pathway begins at the entry aperture location and proceeds along a circular arc to a location AD/2 towards the distal end of the tentacle from the initial entry aperture and transversely offset by RD/2 from the initial entry aperture, arriving at that location at an angle equal to arc tangent of ((AD/2) divided by (RD/2)), the optimal cable pathway continues from this location to of the exit aperture along a circular arc arriving at the exit aperture at an angle zero. The diameter of the cable pathway can be slightly larger than a cable diameter plus a minimal diameter allowing for a lubricant.

Still referring to 208 and 218 of FIG. 2A to FIG. 2C, this formula is mathematically constructed to create an optimized radius curve at the entry/exit transfer channel apertures that maximizes a radius of the two arcs into the transfer channel design, that results in a cable pathway having in a least amount of flexure of the cable and cable wear while the cable is in motion or during tentacle motion. Thereby, minimizing an amount of cable material fatigue during the tentacle gripper operation, as well as simultaneously minimizes an amount of side load of the cable generated by cable motion through entry/exit transfer channel apertures of the transfer channel. While, also concurrently minimizing an amount of transmission friction during the tentacle gripper operation, which will prolong the operational life of the cables and hence operational life of the tentacle gripper.

Passthrough Hole-Transfer Aperture (PH-TA) Cable Pathway

While developing the optimized transfer channel entry/exit aperture cable pathways, what was learned from experimentations is that an additional problem/challenge was discovered that needed to be overcome, in terms of designing a cable path between a passthrough hole of a guide disc, i.e. a ring passthrough hole or a spacer passthrough hole, to an entry/exit transfer channel aperture, that had a minimal amount of cable friction and a minimal amount of a flexure path. Additionally, what was realized is less cable friction resulted if the lower and upper cables did not cross within the center passthrough hole of the elastic connector 241. This can be achieved by ensuring that the four apertures proximal to the tentacle base, i.e. palm baseplate, accessing the center passthrough hole of the elastic connector 241 are connected to exit apertures of a distal end of the elastic connector 241, and ensuring that the four apertures distal to the tentacle base, i.e. palm baseplate, accessing the center passthrough hole of the elastic connector are connected to exit apertures of a proximal end of the elastic connector. Therefore, the optimized design places the entry apertures for cables transmitting through the spacer passthrough holes should access the center passthrough holes closer to the tentacle base than the exit passthrough apertures.

Still referring to 208 and 218 of FIG. 2A to FIG. 2C, a realization gained from substantial test experimentations, is that the elastic connector 241 needed to include lower and upper portions having a same length. The reason is that the lower and upper portions of the elastic connector can extend within the lower and upper elastic members and contact each guide disc, i.e. a distal guide disc of the lower elastic member and a proximal guide disc of the upper elastic member. Whereby, minimizing a cable path distance between each respective guide disc and the lower and upper portions of the elastic connector. Thus, this cable pathway is termed a passthrough hole-transfer aperture (PH-TA) cable pathway which is constructed to align a center of a passthrough hole of a guide disc, i.e. a ring passthrough hole or a spacer passthrough hole, to the lower and upper portions of the elastic connector, that has the least cable path distance along with demonstrating a low amount of cable friction and a minimal amount of a flexure path when tested in combination with embodiments of the cable pathway apertures of the transfer channel.

FIG. 2D is a schematic illustrating a tope view of a guide disc having pathways and a thru-center hole with a rounded peripheral edge or convex edge, in order to minimize friction and wear to the elastic tube, according to some embodiments of the present disclosure.

FIG. 3A is a schematic illustrating a soft robot tentacle gripper system 340A, according to some embodiments of the present disclosure. For example, the gripper system 300A includes three tentacles 311A, 311B, 311C actuated using 12 servo motors A-L which have a 180° range of motion. Each of the 12 servo motors A-L have control lines connected to a separate digital I/O pin on an Arduino Mega, so the position of each servo motor can be independently set to any value between 0° and 180°. Each servo motor A-L carries two flexible nylon-covered stainless-steel cables 0.92 mm diameter or cables 329A, 329B attached to opposite ends of a bell crank. Each servo motor cable pair flexes the same tentacle section in opposite directions; an angle of 90° on the servo motor A-L is nominally "zero curvature" for that degree of freedom on that tentacle 311A, 311B, 311C; rotating the servo motor shaft toward 0° flexes that tentacle section in one direction and rotating the shaft toward 180° flexes that same tentacle section in the opposite direction. Other components of the gripper system 300A can include wiring 331 connecting the servo motors (actuators) A-L, a controllable palm baseplate 302A and a controller 350. The controller 350 can be connected to a centralized control system (see 300G of FIG. 3G), or depending upon a user requirements in terms of configurations and applications, the centralized control system may be incorporated at a same location of the controller 350, or located at some other location, or could be integral with the centralized controller 350.

The gripper system 300A is fully actuated via servo motors A-L, with independent motion in every degree of freedom and realizing over +/−1200 of bend per tentacle section for the +/−900 of servo motor shaft motion (the 120° motion limit versus the 162° tentacle section limit is due to limited bell crank arm length lessening the available cable motion, not lack of servo torque). The minimum interior radius at maximum (120°) curvature is about 30 mm.

Eight predetermined grasps are programmed as an example into the Arduino Electrically Erasable Programmable Read Only Memory (EEPROM), of which, there are many more grasps that are programed. These grasps can include several types of pinch and wrap grips (see FIG. 5A to FIG. 6B). Using a potentiometer, an operator can select among these saved grasps, and a serial-over-USB command line interface allows for the fully independent control of individual servo motors by human or control software. The position of each servo motor, actuator A-L is saved in an array; should the operator/user want to create another preprogrammed grasp, which can be done by simply saving the current array under a unique name. Using the Arduino EEPROM, all saved arrays can be recalled, edited, and resaved at any time. Total current draw and voltage delivered to the gripper system 300A is under 8 amps (nominally at a constant 6.2 volts) is monitored at the power supply (see 1008, 1029 of FIG. 10).

Cable-Controlled Transmission System: During experimentation, several realizations were discovered such as the cable-controlled transmission system for some embodiments of the present disclosure. All the experiments included active control using sets of opposing cables 329A, 329B (e.g., one set controlling "pitch" and an orthogonal set controlling "yaw".

Motors Actuators: The soft robotic actuators or motors can be connected to the cable transmission systems for the tentacles, where the component material of the tentacle can have an impact on a level of performance of motor/actuator. For example, the tentacle components may be formed of elastomeric materials, such as rubber, or thin walls of plastic arranged to cover the internal components such as spacers and tube connector structure, where when a force is applied to the cables by the actuator, the tentacle components may stretch, and/or bend under a pressure force applied by the actuator. At least one operational benefit or advantage of the motors/actuators over other types of force generating devices, is that the motor that moves the cables for the cable transmission system can be soft-locked in position by a servo-control to hold the cables in position to prevent either the lower or upper tube movement. Such that the locking aspect holds, for example, the lower tube spacers in place, resulting in providing an extra degree of operable performance for the tentacle.

Centralized Controller: Some centralized controller experiments tested with the embodiments of the present disclosure, were discovered and later incorporated into some embodiments. Some included a centralized controller programmed with logic stored, the logic included instructions for: (a) in order to obtain each set of command instructions corresponding to the stored configured object complete the following steps of; (b) sensing a motion having human like characteristics from an operator wearing a teaching glove having sensors; (c) generate one or more signals representative of at least a portion of the motion by the sensors; (d) converting the one or more signals into a collective set of command instructions to actuate the multiple tentacles, or actuate the multiple tentacles and other devices within a network of robotic devices, wherein the collective set of command instructions is functionally equivalent to the motion; and (e) communicating the collective set of instructions to the centralized control system and the network of robotic devices, the robotic devices are robot assembly devices configurable to operate with the robot system.

Still referring to FIG. 3A, other aspects incorporated into the data used for determining the command database includes types of grasping actions by the multiple tentacles. For example, some types of grasping actions can include: (a) an ulnar or palmer grasp (i.e. a grasp that is a raking motion with finger-like devices trapping an object against a palm-like surface); a raking grasp (i.e. where finger-like devices grasp an object, but the finger-like devices do not include a thumb, and the finger-like device do all the holding. Based on this experimentation, several gripping sequence of actions instructions were developed in order to move different shaped objects.

Another realization realized is that centralized controllers for the soft robot grippers need to overcome the failures of conventional control grippers control architectures, by recognizing the soft gripper control variabilities which vary and can be very different depending upon the differences in the underlying types of gripper material properties. For example, conventional control grippers control architectures have gripping force problems, due to being un-able to produce a large grasping force because to a type of material(s) used in construction of soft robot gripper structure. Some reasons for the gripping force problem by the conventional control grippers control architectures can be due to a lack of quantitative analysis in identifying different levels of amounts of grip strengths associated with each type of grip by the grippers grasping an object. Other reasons for gripping force problems can be a failure of a quantitative analysis in identifying individual advantages of each type of grip mode from a multitude of different types of grip modes, as well as a failure of a quantitative analysis in identifying individual advantages of each type of pull directions from many different types of pull directions.

Still referring to FIG. 3A, for example, the command database includes multiple sets of coordinated sequential control command instructions or tentacle movement programs, that were developed based on quantitatively evaluated tentacles performances, full independent actuation of the tentacles, which was used to develop a full range of grip styles, grip modes, grip strengths, and carrying capacities, used to construct a command database of coordinated sequential control command instructions or multiple tentacle movement programs that the centralized controller or components thereof, can later access. The full range of grip styles can be internal and external grasps each of which may be based on friction (i.e. pinching or clamping), or based on kinematic constraints (i.e. wrapping or power grasps like a human hand wrapping around a baseball bat handle where friction is unnecessary to maintain a grasp). Wherein an external grasp has the tentacle positioned outside of the object, squeezing in an inward direction, and an internal grasp has one of the tentacles inserted into an inner portion of the object, i.e. orifice, hole, etc., and subsequently the tentacle(s) are flexed or expanded (inflated) to grasp the object. Further the grip modes can include modes where one tentacle braces against another tentacle or on top of another tentacle, thereby increases the force on the braced tentacle and hence increases the gripping strength. Wherein during predetermined testing periods, a test centralized control system can set ranges of a minimal gripping force while ensuring a maximum grasp quality that can be predetermined based upon predetermine grasping thresholds. For example, some of the predetermined grasping thresholds can include measured quantities obtained from real-time sensor data, such as: an amount of pressure on the tentacles; measured angles and velocities of the tentacles; i.e. points along tentacles including joint like points; an amount of slippage obtained from a change of the amount of pressure over time; and an amount of force on the tentacles, by non-limiting example.

As noted above, the centralized controller can access the object database that includes an indexing of each object identity and object pose, and access the command database for a desired motion type to retrieve a time sequence of commanded actuator positions and torques, and ranges of expected actuator forces and expected joint torques. Wherein the desired motion types can be flexure along any axis of each tentacle including X, Y, Z, length and axial rotation. Such that, the ranges of expected actuator forces and expected joint torques are well within the bounds achievable by elastomer tentacles with cable tension elements.

Still referring to FIG. 3A, specifically, some other aspects of the quantitative analysis include types of grasps for grasping different shaped objects, along with types of grasps for grasping different object poses of multiple poses for each shaped object. The types of grasps for both the target object shape and pose can include aspects such as: (1) a level of grip strength for each tentacle to hold the object shape as well as an overall level of grip strength for all tentacles to hold the object shape; (2) a gripping performance level for each grip mode of multiple grip modes; and (3) a pull performance level for each pull direction of multiple pull directions.

Some other aspects incorporated into the data used for determining the command database includes grasping force control variabilities base on the types of gripper material properties, gripping performance levels by the multiple tentacles to move a specific target object configuration, a sequence of control signals to be executed including actuator positions, expected torques, forces and positions to be experienced at those steps, timing between steps in the sequence of steps, and at each step an alternative set of steps to take in case the initial identified torque, force, or position or some other measurement(s) had not been within preset bounds. A grasp quality can be a measure that indicates a relationship between distributing forces and moments on a grasped object that can be applied by the gripper as to not damage the object. Some predetermined testing included moving objects in order to determine a highest quality grasp based upon predetermined grasping thresholds, such that if a higher level of disturbance is possible, then the quality of grasp may be higher. For example, a total gripping force by the tentacles can be considered a sum of the individual forces. Other forces considered include static forces in view of a direction of gravity (i.e. can include a maximum acceleration in a direction of gravity), tentacle acceleration in a direction perpendicular to gravity (i.e. alternatively may be detected via based on measuring an amount of slippage).

Types of Sensors and Applications Using Sensor Data

Still referring to FIG. 3A, contemplated is that environmental sensors positioned in the work area of the object to be moved can obtained environmental data (i.e., moisture, temperature, dust, etc.), to assist the tentacles gripping and releasing micro-objects. For example, the environmental data can include using measured data such as an amount of a measured capillary force, electrostatic force, etc. Wherein an amount of a measure of moisture from air in the work area is condensed into a thin layer of water on surfaces of the object that tentacle intends to use to move the object.

Embodiment Developments

Still referring to FIG. 3A, in developing the embodiments of the present disclosure some experimentation included both natural evolution's inspiration and human anatomy research, in order to discover some mechanical structures including the tentacles, and control capabilities via controllers with processors and other components. Some experimental aspects analyzed and researched sea anemones, octopus, squid and elephants, all of which, included poses of flexible organs of manipulation, but along with having radically different control methodologies. Some of the human-designed tentacle experimentation included multiple drive methodologies (pneumatic, hydraulic, tension cable), based on a single tentacle with several actuators. However, at least another realization realized from these experiments is that a single tentacle with several actuator configurations was too restrictive in many aspects. Thus, another realization is that the soft grippers of the present disclosure needed an increased usefulness for the tentacles over the single tentacle configuration, in order for each tentacle to have independent-actuated capabilities, along with centralized control to coordinate the movements of all the tentacle gripping actions.

Thus, the command database can be used to identify an associated set of coordinated sequential control command instructions or an object movement program, based on having identified the object shape, the specific object shape's pose, and having received the specific type of multiple tentacle movement actions via the operator. For example, in order to use the command database of stored multiple sets of coordinated sequential control command instructions or multiple object movement programs, the target object shape needs to be identified, and that the target object specific pose needs to be identified. However, if the object shape is a circle, then there is no need to incorporate the object pose, since a circle shape has only one pose. For object shapes having multiple object poses, and in order to identify the sets of coordinated sequential control command instructions from the command database, then the specific object pose associated with that object shape also needs to be identified.

Figure 3B:
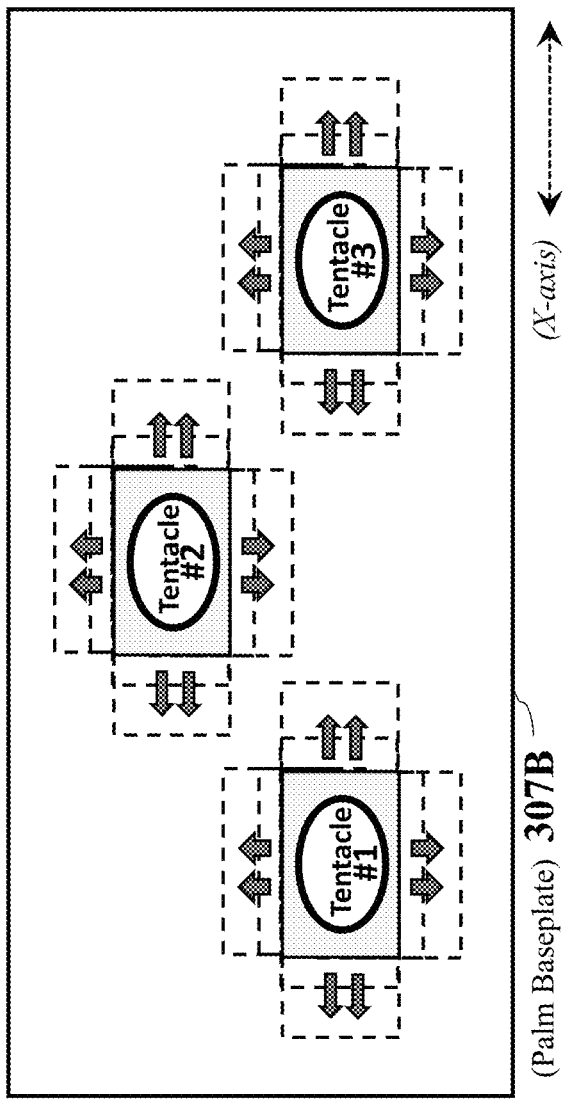
FIG. 3B is a schematic diagram illustrating a configuration of a palm base plate, such that each tentacle of the multiple tentacles can move independently from the other remaining tentacles in a X direction along an X-axis, as well as in a Y direction along a Y-axis, according to some embodiments of the present disclosure.

FIG. 3B is a schematic diagram illustrating a configuration of a palm baseplate 302B that can be fixed or controllable, such that each tentacle of the multiple tentacles can move independently from the other remaining tentacles in a X direction along an X-axis, as well as in a Y direction along a Y-axis, on the palm baseplate 302B, according to some embodiments of the present disclosure. For example, each tentacle can be moveable using a screw mechanism to translate the tentacle lower elastic tube or proximal end along the X-direction or the Y-direction of the palm baseplate 302B, or both, in order to further optimize tentacle group strength performance. Wherein commands are generated by the centralized control system and are implemented by actuators (not shown) to activate the screw mechanisms.

Figure 3C:
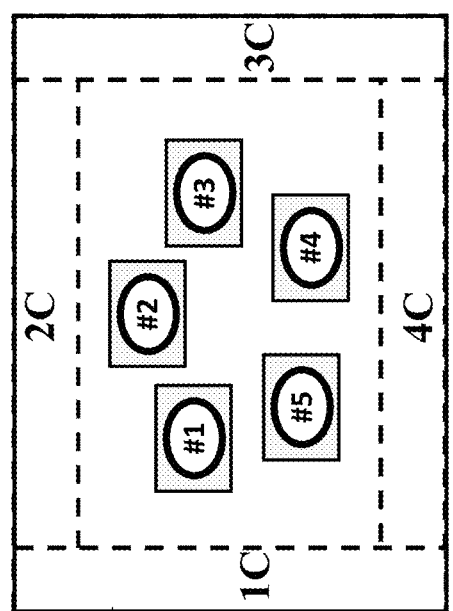
FIG. 3C is a schematic diagram illustrating another configuration of the palm base plate, such that the palm base plate outer edges may be adjustable either in/out along a horizontal plane B (HP-B) or along degrees of a vertical plane A (VP-A) of the palm base plate, according to some embodiments of the present disclosure.

FIG. 3C is a schematic diagram illustrating another configuration of a controllable palm baseplate 302C, such that the controllable palm base plate includes controllable outer edges 1C, 2C, 3C, 4C that are adjustable either in or out directions along a horizontal plane B (HP-B) or along degrees of a vertical plane A (VP-A) of the controllable palm base plate, according to some embodiments of the present disclosure. For example, tentacles 1, 2, 3, 4, 5 can be controlled to utilize any one of the controllable portions 1C, 2C, 3C, 4C of the palm baseplate 302C, to further optimize tentacle group strength performance.

Figure 3D:
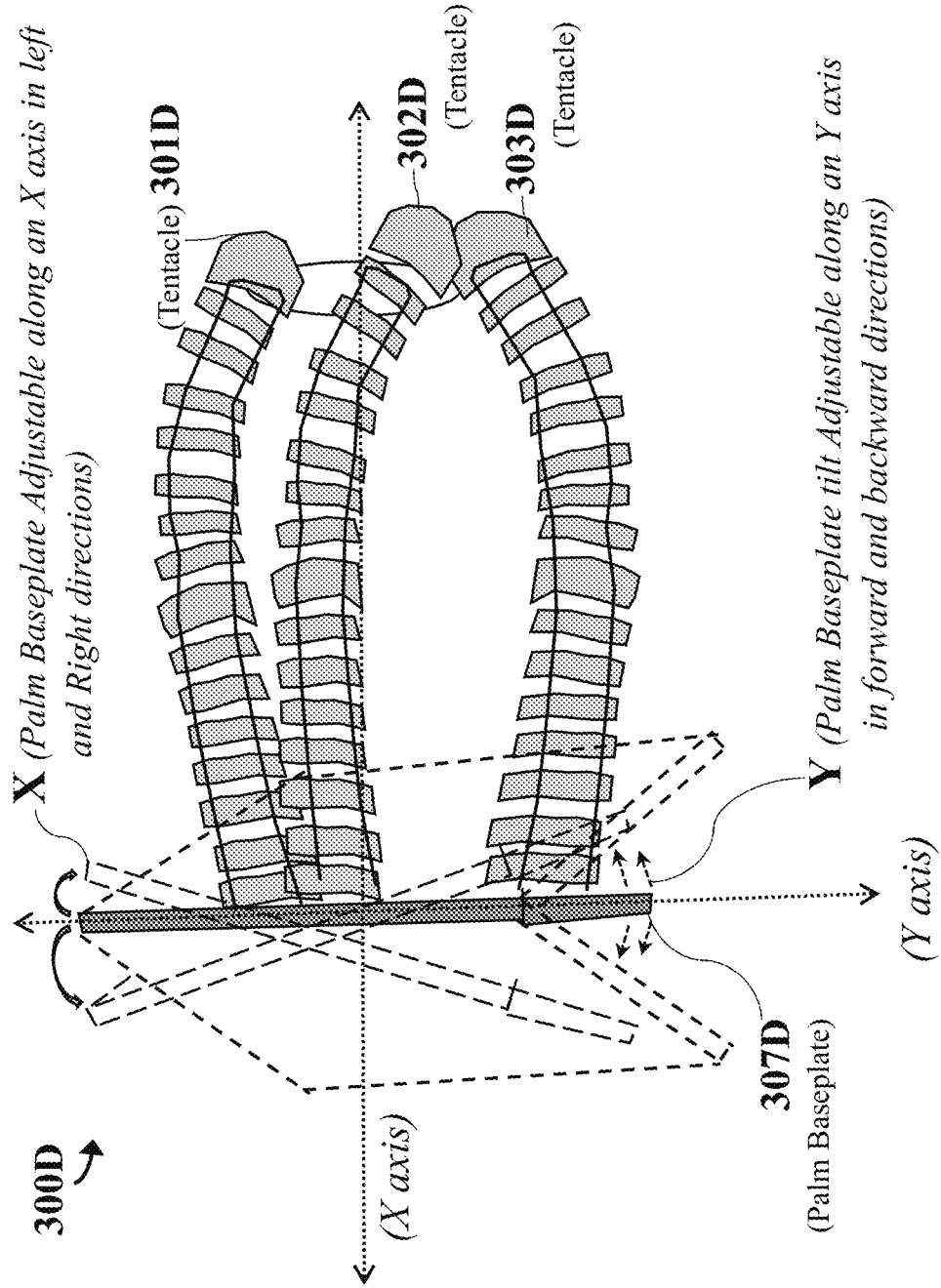
FIG. 3D is a schematic diagram illustrating the palm base plate is adjustable, along a Y axis so as to be tiltable toward or away from the tentacles, as well as adjustable along an X axis to a left or right direction, according to some embodiments of the present disclosure.

FIG. 3D is a schematic diagram illustrating a controllable palm base plate that is adjustable, along a Y axis so as to be tiltable toward or away from the tentacles 301D, 302D, 303D, as well as adjustable along an X axis to a left or right direction, that can optimize tentacle group strength performance, according to some embodiments of the present disclosure.

Figures 3E, 3F:
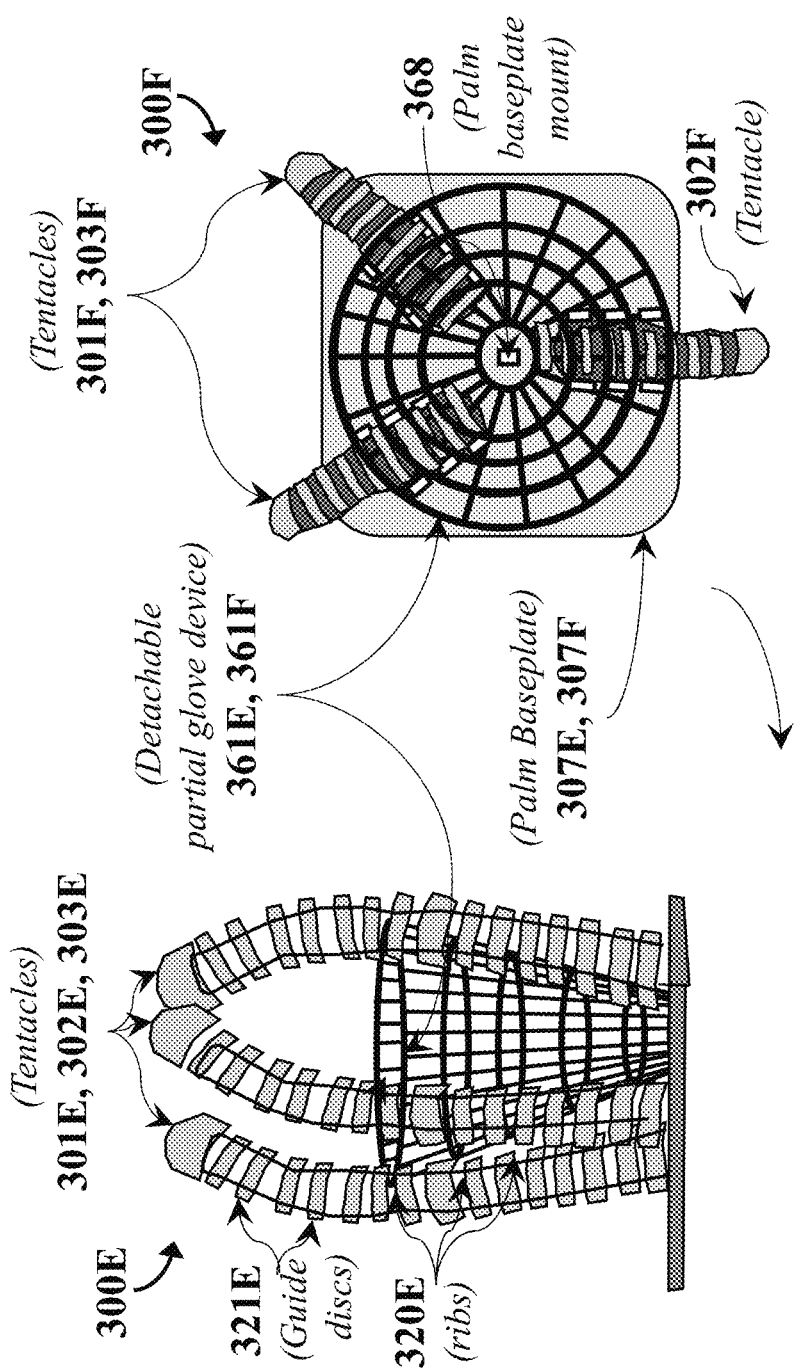
FIG. 3E is a schematic diagram illustrating a side view of a detachable partial glove device, according to some embodiments of the present disclosure.
FIG. 3F is a schematic diagram illustrating a side view of a detachable partial glove, according to some embodiments of the present disclosure.

FIG. 3E is a schematic diagram illustrating a side view of a detachable partial glove device, according to some embodiments of the present disclosure. The partial glove 361E provides additional surface area for the tentacles to grasp as well as conforms to contours of the object, resulting in a maximum grasp quality with higher levels of secured grasps, an increased amount of reliable and stable grasps, as well as less percentage of damaging fragile objects or dropping objects. Observed from test experimentation is that the partial glove performed substantially well, when attached to each tentacle and the palm base plate, along with having stiffening support rib portions axially aligned with some lower member guide rings. Also observed from test experimentations is that an amount of gripping performance and an amount of elasticity of the partial glove both needed to be customized according to a set of predetermined optimized grasp thresholds corresponding to the specific object configuration and associated characteristics/aspects. For example, some of the partial glove customization included one or more gripping features positioned between each tentacle that contact the object to be moved, such as: an amount of dimples, ridges, etc.; types of patterns of dimples, ridges, etc.; an amount of one or more textured materials; patterns of one or more textured materials; an amount of sticky material or non-sticky material or patterns thereof; an amount of size of spacing in a mesh material; or an amount of an abrasive material.

The test experimentation was organized to move test objects within different work environments in different work areas, using the tentacles of the present disclosure, tentacles fitted with partial gloves, wherein each partial glove was customized according to each test object, and conventional grippers from conventional gripper systems. The tentacles and tentacles fitted with the partial gloves had capabilities including: (a) moving objects with ODs from about 30 to 95 mm, while have an opposing finger gap of about 63.5 mm; (b) a cycle time of 88 msec to close and 166 msec to open; and (c) a grip force of about 2.5 lb per finger. Each test object used per test experimentation had known stored data including the set or sets of known predetermined optimized grasp thresholds corresponding to the test object configuration and associated characteristics/aspects. Further, each partial glove fitted to the tentacles was customized according to the test object per test experimentation.

The partial glove 361E was tested and compared to the tentacles of the present disclosure and to conventional gripper systems, grasping and moving objects including having sizes in a range of 425 mm length×200 mm width× 200 mm height, objects classified within the global product classifications from GS1-GPC list, deformable objects, non-deformable objects, objects having different configurations, characteristics and aspects, as disclosed. The testing included obtaining real-time sensor data from real-time sensing from environmental sensors and sensors associated with the gripper system of the present disclosure. Further, the test embodiments used met requirements of FDA-CFR Title 21 for food-contact materials and were rated IP67 protection class, as well as operated at decibels below 85-dB. Expected during the testing is that some non-uniform shaped objects, deformable objects, etc., could get dropped by the tentacles due to the tentacles not obtaining an initial quality grasp.

Observed from the test experimentation is that the tentacles of the present disclosure performed outstanding, when compared to the same size conventional gripper systems in all areas. Also observed is that the tentacles fitted with the partial glove 361E performed outstanding, and in some test experiments provided an increase confidence level to observers of ensuring high quality grasps of the tentacles of the present disclosure for those specific test experiments, and when the tentacles fitted with the partial glove were compared to the same size conventional gripper systems, they out performed in all areas. At least one benefit of using the partial glove is a minimum cost fabricating customized configurations of partial gloves 361E, when considering an amount of additional assurances and grasp quality performance levels noted above. Other additional benefits include a faster tentacle operational time, which translates into a decrease in per unit production times, less maintenance cost, and less tentacle component material fatigue. Contemplated is that the partial glove 361E can be constructed to have detachable sections, such as only contacting 2 tentacles of a three tentacle gripper while still attached to the palm baseplate, or some other type of configurations, all of which can depend upon the specific intended object to be moved in view of the object type, characteristics and aspects.

The partial glove 361E can be constructed of one or more types of materials having one or more aspects such as; levels of stiffness, levels flexibility, levels of grip-ability, levels of durability, levels of textures, levels of resistance to stickiness, varied amount of open spacing of the partial glove construction, patterns of open spacing; levels of permeability, levels of temperature rating, levels of strength, levels of resistance to chemicals, levels of partial glove material fatigue, amount of durability, an amount of thickness. Wherein an amount of cost and weight of the partial glove material(s) will likely depend upon a user's operational requirements or some other parameters specific to the user. The partial glove 361E can include patterns of open spacing based upon predetermined optimized test performances for moving test objects. Contemplated is that an operator may provide operator data prior to the tentacles moving and object in real-time, wherein the operator provides data indicating that a customized partial glove should be fitted to the tentacles to move a specific target to obtain optimum performance aspects. Wherein the operator data can be compared to a stored database having the recommended operator customized partial glove to be fitted to the tentacles, and the centralized control system can generate a set of commands for getting the customize partial glove to be fitted to the tentacles before moving the target object.

FIG. 3F is a schematic diagram illustrating a top view of a detachable partial glove, according to some embodiments of the present disclosure. The detachable or fixed partial glove 361F can snap-in-to and attach to the palm baseplate 307F, such that the partial glove 361F can attached to the tentacles 301F, 302F, 303F by conventional methods, Velcro, straps, or other methods. The partial glove 361F attaches to the palm baseplate 361F and extends a long a length of each tentacle. The length of each partial glove can be predetermined as noted above. The partial glove 361F wraps around contours of each different shape and size object to increase an amount of surface area holding coverage on the object to be moved. For example, types of pick and place applications can best take advantage of tentacles fitted with the customized gloves, including such applications including moving: types of organic foods, fragile objects, etc. Wherein the partial glove 316F provides an increased an amount of grasping control and grasping quality, decrease per unit object move production time, when compared to convention gripper systems of the same size.

Technical Attributes and Practical Applications

Embodiments of the present disclosure are configured to be compatible with most commercial robot controllers in gripper and non-gripper industries, to provide turnkey integration, enabling users/operators to quickly install and commission the innovative multiple tentacle system for new or retrofit applications with no additional components or control hardware. Embodiments of the present disclosure are configured to operate in many different types of gripper and non-gripper industries. For example, the innovate embodiments can execute tasks at an amount of a pace faster than convention gripper systems due to the new tentacle design(s) and controller attributes. Some of the gripper industries at which the innovative embodiments can outperform conventional gripper systems can include co-operational human/gripper systems that the innovative embodiments work side-by-side with people in food harvesting, automated harvesting and packaging of fruits and vegetables, where the innovative embodiment excel over conventional gripper systems due to: (a) high degree of dexterity of multiple tentacles; (b) exhibit physical robustness and human-safe operation at a lower cost, higher productivity task completion, at no human safety; (c) little or no product loss of product handling, high degree of sanitation with a level of delicate manipulation; (d) the multiple-tentacle grasps with 12 DoF and optional null-space provide high levels of performance for sorting and packaging applications involving delicate produce and bakery items, like apples or small chocolates, as well as with other like delicate non-perishable products. Other gripper industries can include the medical industries, warehouse and manufacturing industries, such that the innovative multiple tentacle system can: (a) provide a high degree of medical assistance; (b) excel in e-commerce warehouses requiring grippers that require high degrees of dexterity that can manipulate packages of various sizes, shapes, weights and an amount of softness (i.e. bags filled with product), along with warehouse logistic applications involving unpredictable-size objects.

Some advantages and benefits of the embodiments of the present disclosure operating the above gripper system operating environments over conventional gripper designs and systems can include: (a) few parts operational components which eliminate bearings, shafts and other mechanisms that can fail and/or require extensive maintenance costs in some gripper industries having harsh environments, i.e. dust, smoke, etc.; (b) weigh less, safer due to the reduced weight and high dexterity results in a minimum amount of impact forces in an event of a collision; (c) a degree of adaptability, plug and operate, repeatable and a high degree of reliability, via a quick release tentacle mechanism option; (d) configured to operate and complete advanced assembly tasks that currently require significant labor; (e) packaging, food and beverage, and industrial robots adaptively handle varying objects with a single easy-to-use device, eliminating a need for tool/tentacle changes and complex vision/sensor requirements; and (f) high-speed controller with millisecond response ensures repeatable and reliable actions.

Figure 3G:
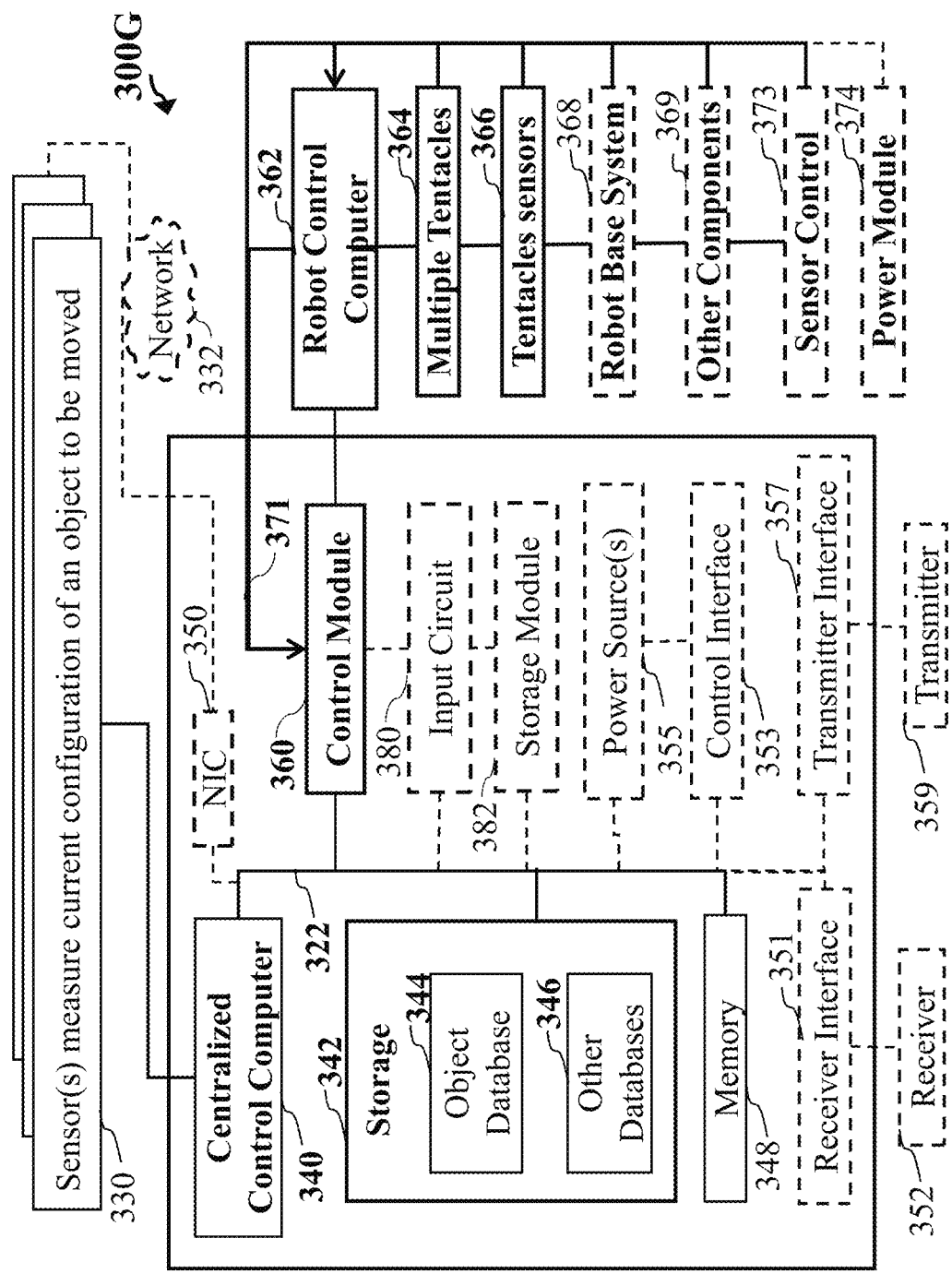
FIG. 3G is a schematic diagram illustrating some components for a centralized controller system of the soft robot gripper system of FIG. 3A, according to some embodiments of the present disclosure.

FIG. 3G is a schematic diagram illustrating some components for a centralized controller system 300G of the soft robot gripper system, according to some embodiments of the present disclosure. For example, a centralized control computer 340 can be connected to sensors 330 located within an environment (not shown) and positioned within a sensing distance of at least one object (not shown) to be moved by the centralized control computer 340. Other sensors can be sensors embedded in one or more tentacles or sensors mounted on the robot system or sensors located in an area of the workspace. Some of the other sensors can include cameras, video cameras, speed sensors, light sensors, environmental related sensors (i.e. temperature, humidity, fire, air, water, barometer sensors, etc.). The other sensors can obtain target object data including data from imaging or optical sensors that can determine physical object aspects, such as size, shape, position, orientation, outer surface textures, porosities and a degree of grip-ability of the object, i.e. smooth, wet, slick, etc., based on observing the outer surface of the object. Some of the other sensors can include distance sensors, depth sensors, force sensing, tactile sensing, pressure sensing, voltage sensing, conductance sensing, ultrasonic sensing, x-ray sensing, or other sensing), such as to determine physical aspects of an object to be grasped. Other sensing data can be obtained associated with the object to be grasp deformability and weight. The sensors 330 and other sensors can be hardwired and/or wireless, connected to a network 332 that is within an operating distance range of the sensors 330 and the other sensors.

The centralized control computer 340 is connected to a bus system 322 that connects to storage 342. The storage 342 can include an object database 344, and other databases 346. A memory 348 is connected to the bus system 322, along with a receiver interface(s) 351, a receiver(s) 352 and a power source(s) 355. The power source(s) 355 can be connected to the bus system 322, connected to a control interface 353, or be configure to have a multitude of other configurations, all of which, is contemplated depending on the specific user/operator intended specific needs for operations. It is possible the power source(s) can be electric, renewable energy sources, chemical, as well as directly connected to the soft robot gripper system, have a multiple external power sources of different types, or both. A transmitter interface(s) 357 and transmitter(s) 359 are connected to the bus system 322. Also, a network interface controller 350 (NIC, also known as a network interface card, network adapter, LAN adapter or physical network interface, and by similar terms, is a computer hardware component connecting a computer to a computer network) is connected to the bus system 322 and can be in communication with a network 332 or other different types of wireless networks (not shown). Again, depending upon the special needs for operation & sensitives needed by a user/operator for their intended use.

Still referring to FIG. 3G, control module(s) 360 can be connected to the bus system 322. The control module(s) 360 can be connected to a robot control computer(s) 362, that assist in directing components of the robot control computer 362. Some components can include, by non-limiting example, multiple tentacles 364, tentacle sensors 366, robot base system 368, and other robot related components 369, which all can be connected to the robot control computer(s) 362, and/or the control module 360, via 371. The control Module 360 can be configured from robot control computer 362 to check a multi-tentacle force status once, and report back, thereby confirming or refuting a grip of an object (not shown), or to continuously monitor the multi-tentacle operational status at frame rates and interrupt the robot control when the multi-tentacle indicates either a good or an invalid grip. Contemplated is that the robot control computer can have a power module 374, that can include any power source that provides power to the robotic system such as a power adaptor or a rechargeable battery pack depending on the user specific requirements.

The centralized control computer 340 can implement or execute stored instructions that are stored in memory 348, storage 342 or access from a cloud storage via the network 332, in particular, the centralized control computer 340 can access the prestored data including data from the object database 344, the instruction database 346, or other stored data from other databases (not shown), as noted above. Contemplated is that some embodiments of the present disclosure can have a centralized controller designed with control architectures to obtain and receive data that can be stored in databases and later accessed by the centralized controller. Wherein, data for the databases can be associated with received data from third parties, past operational soft robot gripper data, sensed data sensed from sensors within an environment of the object, and any other data associated with the soft robot gripper operation, maintenance, management, performance, data associated with adaptability methods to new concepts, etc. or data not associated with the soft robot gripper.

Still referring to FIG. 3G, the robot control computer 362 can command each tentacle of the multiple tentacles 364 to move long an X axis, Y axis or Z axis 425 (see FIG. 4), to open, close the multiple tentacles or some other action command. Contemplated is that the centralized controller system 300G can include a sensor control computer 373 connected to the tentacles 364, tentacle sensors 366, robot base system 368, and other components 369. The sensor control computer 373 can include a hardware processor (not shown) connected a memory (not shown) that includes stored software (not shown) and pre-learned XY sets database that includes labels and surface force values. The hardware processor (not shown) implement or execute stored instructions that are stored in memory (not shown), and when any sensor data is received, the received data can be compared to stored data, and send sensor data/signals, such warning messages, a level of grasp/grip by one or all tentacles, etc., to the robot control computer 362 or other components of the system 1400.

Figure 4:
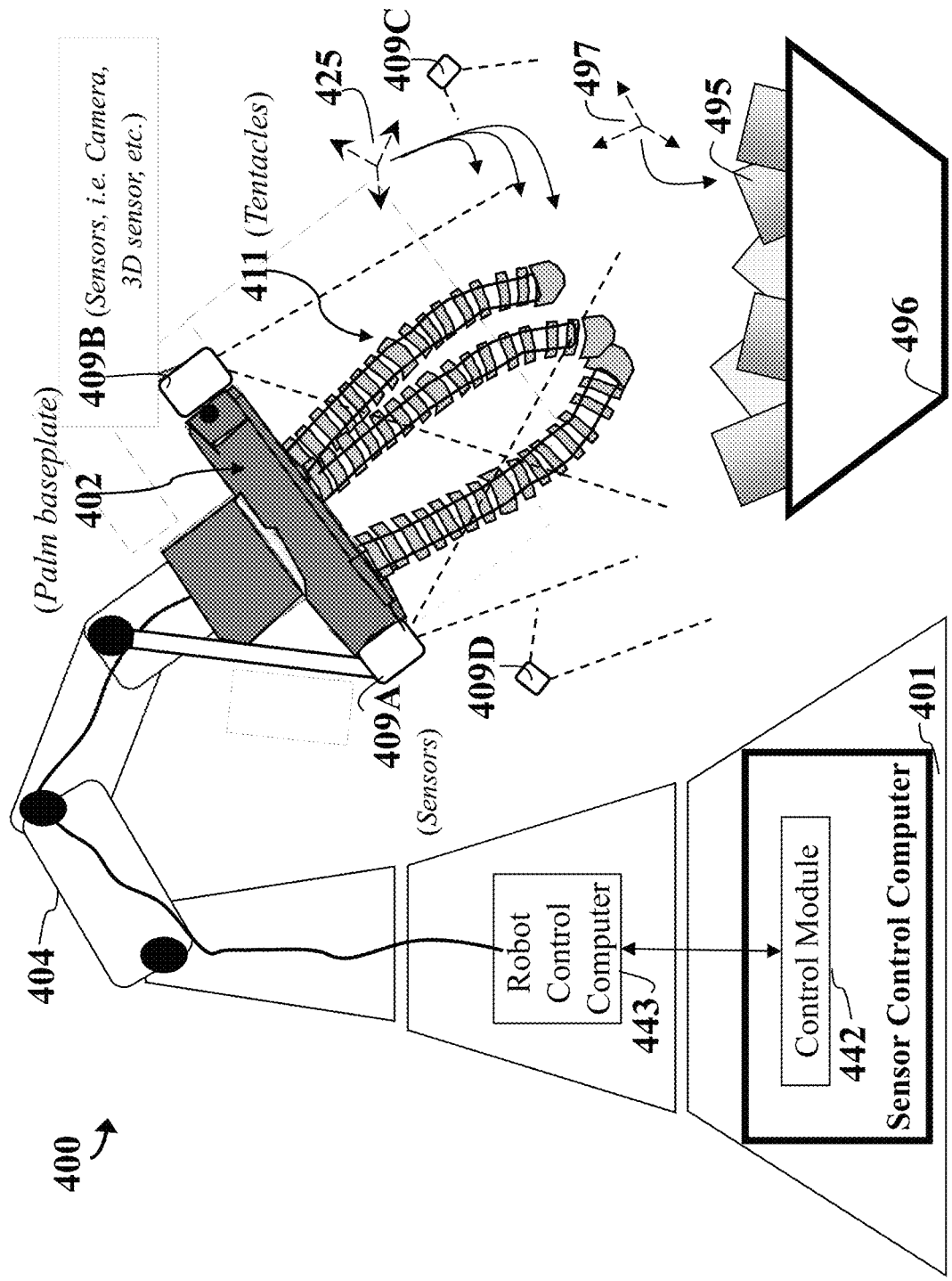
FIG. 4 is a schematic diagram illustrating an embodiment of a robot assembly including incorporating the soft robot gripper system along with elastomeric sensors on the palm base plate, according to some embodiments of the present disclosure.

Contemplated is that the sensor control 373 of FIG. 3G can be used to determine the target object 496 of FIG. 4 location and orientation in the bin 496 of FIG. 4. The sensors 409A-D of FIG. 4 can be configured as cameras that generate images for after tentacles grasping analysis such as determining if the tentacles has a certain type of tentacles grip, grasp one or more target objects 495 from the bin 496 of FIG. 4, or both, along with a position and an orientation of the grasped target object. Contemplated is that other malfunctions and errors could happen during the processing of the target objects by the multiple tentacle gripping system associated with bin grasping or some other associated actions. At least one reason the sensor control 373 of FIG. 3E has been utilized is because objects can become stuck together or entangled, and if not recognized early and removed, such object entanglement, will cause several errors to occur. For example, if the tentacles had grasp multiple objects, the multiple objects could fall from the grip, or the multiple objects could crash into other components, in either scenario, there is a potential of lost per unit cost, lost manufacturing time, cause safety problems to human workers, etc. The sensor location can be configured based upon an intended goal or monitoring type of analysis specific to an operator's intended operational management goals, concerns and machine system requirements. Further, software can be associated with the sensor control system that can use images from cameras to detect the position and the orientation of the target object in the tentacles after the tentacles have grasped the target object from bin 496 of FIG. 4. This software can be configured multiple different ways including being the same software that detects the locations of the target object in the bin 496 of FIG. 4 or separate from that software. This software may be in a controller that has or is a computing device, or possible in a separate computing device. Contemplated is the that cameras could be smart cameras that built in them a computing device.

Figure 9:
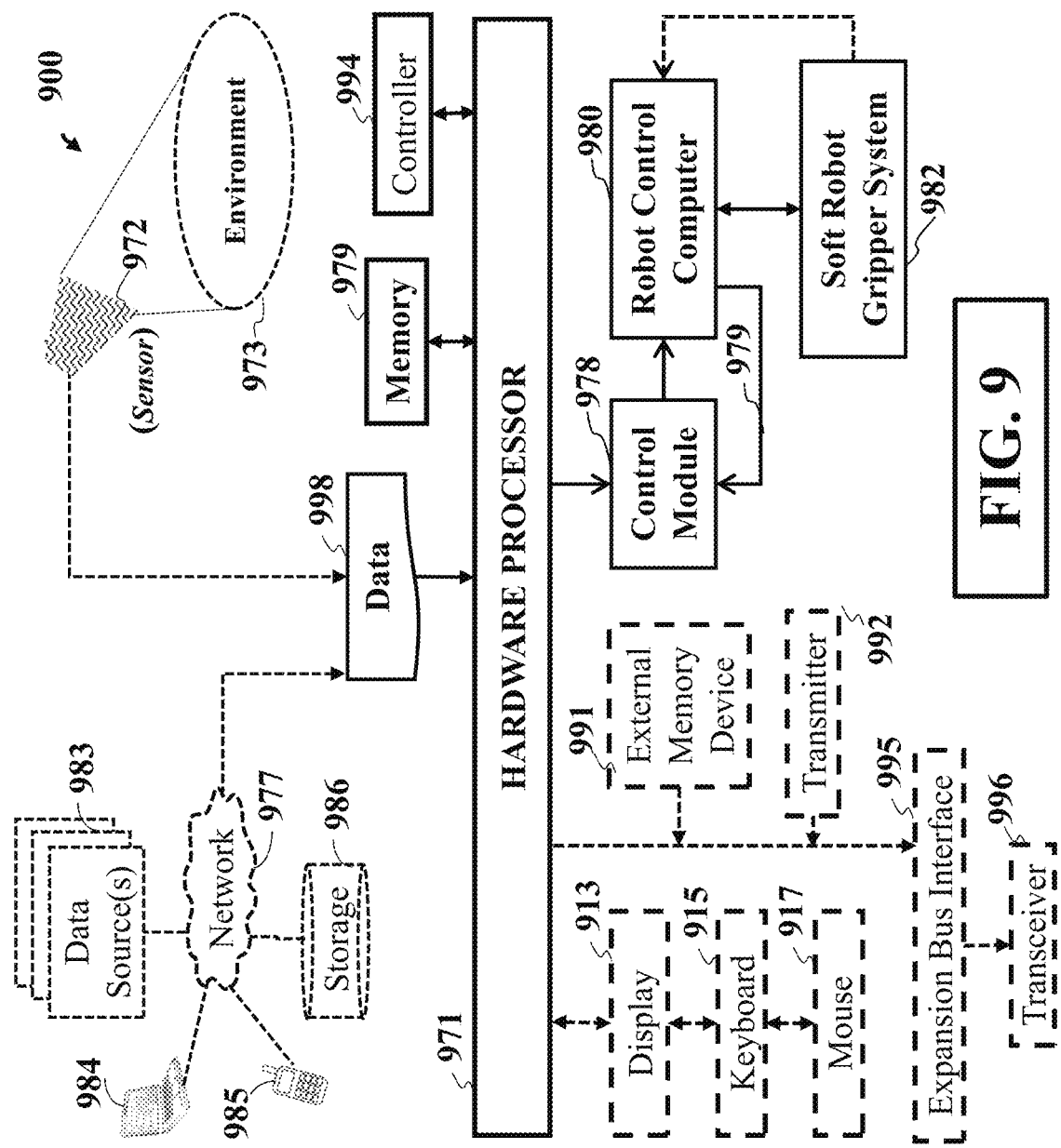
FIG. 9 is a schematic diagram illustrating an alternate centralized controller system that can be used for implementing some methods associated with the soft robot gripper system, or be combined with the centralized control system of FIG. 10, and/or with the centralized controller system of FIG. 3E, according to some embodiments of the present disclosure.
Figure 10:
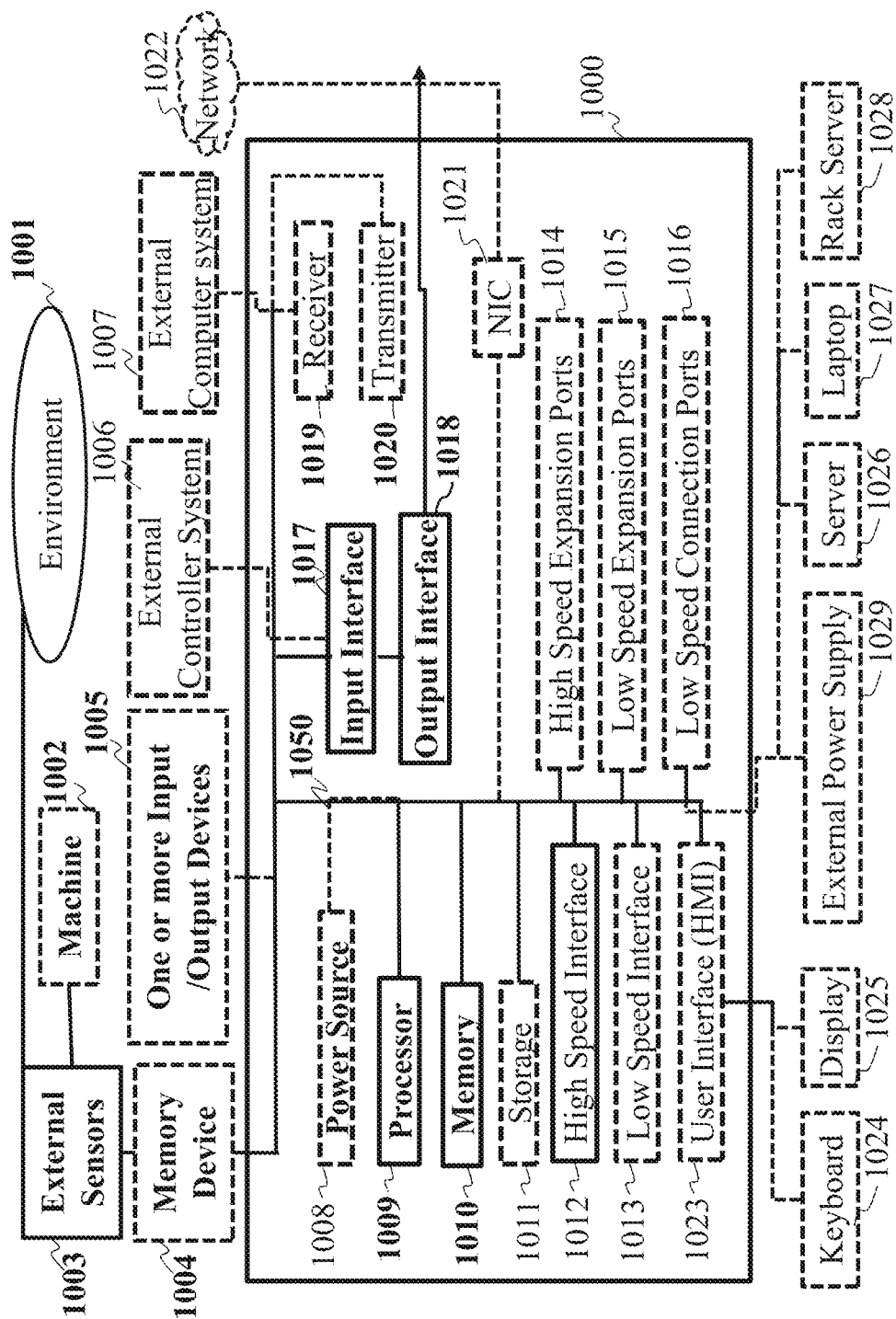
FIG. 10 is a schematic diagram illustrating an alternate centralized controller system that can be used for implementing some methods associated with the soft robot gripper system, or be combined with the centralized control system of FIG. 9, and/or with the centralized controller system of FIG. 3E, according to some embodiments of the present disclosure.

Still referring to FIG. 3E, the control or controller module 360 can include different applications and programs for implementing methods of the present disclosure. For example, the control module 360 can include applications for processing information received from the robot control computer 362, such as generating graphs, operation related models including 3D models of the environment where the robot system is located as well as an object specific type of model. The control module 360 can include applications for interpreting control inputs, or input signals, received via the input circuit/interface module 380, storage module 382, and generating commands/actions at the robotic control computer 362. For example, some aspects of the robot system can include types of control methods relating to stable and scaled motion, combination related control of the tentacles with the palm base structure or other structures, collision detection and avoidance, compliance control and constrained motion, etc. The input circuit can integrate display features as represented in FIG. 9 and FIG. 10. A user can display can be configured for views and models of the target object. Also, the displays can also be configured to operate to receive control inputs from various input devices, (i.e. voice and/or audio recognition software, touch screen and joystick controller. Other example input devices for example related to co-operation or working side-by-side with humans, can include neural and brain implant controls, and motion and/or gesture-tracking systems. At least some advantages of having an efficient centralized controller architectural design for industrial manufacturing applications, all of which required extensive engineering, in order to integrate the knowledge of operational theories and practices essential to industrial/manufacturing issues that impact stability, safety, and serviceability.

In regard to the stored databases 344, 346, data stored in databases 344, 346, can include tentacle gripper/object manipulations that are previously tested during a testing period to identify optimized tentacle gripper/object manipulation according to predetermined tentacle gripper/object manipulation thresholds, to move test objects from starting positions to final positions under different environmental conditions within different types of test object workplaces, which are stored in databases.

Still referring to FIG. 3E, an object configuration (shape and pose) is first used to identify a stored object configuration from the stored database of object configurations using target object data obtained from real-time sensors of the gripper system. However, each object configuration has other aspects including different sizes, weights, positions, orientations, etc.) in combination with object characteristics (i.e. types of textures of object outer surface material; (b) two-dimensional (2D) or 3D shapes of object; or (c) degrees of object's grip-ability such as wetness, smoothness or slipperiness).

During the testing period, each object configuration, (i.e. different sizes, weights, positions, orientations, etc.) in combination with the above object aspects, are each tested with all different types of grip styles, grip modes, an amount of grip strengths, an amount of carrying capacities, for grasping the object of different sizes, weights, positions, orientations, and object characteristics, (i.e. surface smoothness/texture, rigidity/deformability), while under different types of environmental conditions, to move test objects from a starting position to a final position, for each type of object workplace, i.e. test objects randomly in bin, test objects located on a worksurface, etc., in order to identify optimized tentacle gripper/object manipulations according to predetermined tentacle gripper/object manipulation thresholds, which are stored.

Still referring to FIG. 3E, the testing data is recorded into multiple databases such as grasp classifiers, object characteristics and aspects, tentacles configurations, environmental conditions, object workplaces as well as sets of commands corresponding to all combinations (i.e. different object configurations combined with one or more object characteristics and aspects) that are stored in the multiple databases. Each classification in each database corresponds to data from the other databases. For example, stored in the object database can be a first test object configuration having a specific shape, pose, size, weight, position, orientation, etc.) along with object characteristics (i.e. a type of a texture of an outer surface material of the first test object, etc.). The first test object can include corresponding data such as types of grip styles, grip modes, an amount of grip strengths, an amount of carrying capacities, for grasping the first test object under one or more environmental conditions, to move first test object from a starting position to a final position, for each type of object workplace, which all correspond to stored sets of commands (i.e. optimized tentacle gripper/object manipulations according to predetermined tentacle gripper/object manipulation thresholds). Of the first test object stored sets of commands in the command database, there is within the sets of commands individual sets or subsets of commands that uniquely correspond to each different combination of object configurations with one or more first test object configurations.

Thus, upon receiving operator data and target object data from real-time sensors, the received operator data is compared to the stored data to identify if the received data corresponds to the first test object, such as pickup actions that could be in the received operator data. If the pickup actions are received and confirmed in the stored database, then the corresponding set or subset of commands to the pickup actions stored in the command database are selected. Further, upon receiving the object data from the real-time sensors, the received object data is compared to the stored data to identify if the object data if the received object data corresponds to the first test object, such as a type of a texture of an outer surface material of the first test object. If the type of texture of the outer surface material of the first test object is in the stored database, then the corresponding set or subset of commands to the type of texture of the outer surface material of the first test object stored in the command database are selected. Noted, is that the tentacles can have one or more tentacle configurations which would include another set of data associated with each tentacle configuration for the different combinations of object configurations with object characteristics and aspects.

Still referring to FIG. 3E, contemplated is that databases can include an instruction database, an object historical database, an instruction historical database, an environmental database, a human worker database where each worker includes a profile associated with characteristics of the worker profile and abilities, (i.e. worker associated levels of worker speed, worker handicap limitations, worker health, etc.), and other databases have data related to operation and information usable by the soft robot gripper system. Again, depending upon each user/operator's specific operational configurations, required structure limitations, special needs, sensitivities of an intended use of the soft robot tentacle gripper system, many different other configurations are contemplated.

FIG. 4 is a schematic diagram illustrating an embodiment of a robot assembly 400 including incorporating the soft robot gripper system along with elastomeric sensors 409A, 409B on the controllable palm baseplate 403, according to some embodiments of the present disclosure. For example, the soft robot gripper system of the present disclosure is incorporated into a robot assembly, where the tentacles 411 and two elastomeric sensors 409A, 409B are positioned on the palm baseplate 402. For some applications, at least one goal may be to pick up an object 495 from random objects in a bin 496 based on an object shape and pose 497. The tentacle gripper can include a 12 degree of freedom (DoF) with the tentacles 411 and 6 DoF robotic arm 404. 3D sensors 409A, 409B can be arranged on the arm 404 to acquire data of the scene including the objects 495, tentacles 411, bin 496, along with other objects, weather, etc., that may be used for enhancing the robot assembly process or manufacturing processes. Then, the tentacles 411 can pick up a target object from the objects 495 from the bin 496. It should be noted that the bin 496 could contain different objects that can be different sizes and shapes, along with different weights. Contemplated is that a robot can be designed to include more than 6 joints which implies even with a fixed based and fixed gripper position, an extra degree or degrees of freedom remains with the joint positions with the robot, i.e. termed a "null-space" of the robot, as motion in the null-space does not move the gripper position at all. This motion in the null-space allows the gripper to reach an object 495 while having the gripper avoid touching another object within the workspace that should not be touched or bumped. For example, a human arm reaching outward to a point about nose height and about two feet in front of a human face has a null-space of the elbow moving upward and downward without motion of the shoulder or the hand, by reaching over or under an obstruction such as a pipe obstruction. At least one further innovation is that the multi-tentacle gripper includes a null-space so that the tentacle 411 themselves can move without changing the position or grasping location on the object 495 being grasped. Thus, the multi-tentacle gripper can negotiate and avoid obstacles in the workspace while maintaining a grasp of the object 495 by the tentacles 411.

Still referring to FIG. 4, an example can be that the 3D sensors 409A, 409B may include additional sensors 409C, 409D, such that two or more sensors of the sensors 409A-409D use structured light generated by a projector. It is possible two or more sensors of the sensors 409A-409D, can be stereo cameras and time-of-flight range sensors. These sensor(s) 409A-409D can acquire 3D scene data, e.g., a point cloud. The 3D sensors can be calibrated with respect to the robot arm 404. Thus, the poses of the objects 495 can be estimated in a coordinate system of the 3D sensors that can be transformed to a coordinate system of the robotic arm 404, allowing grasping and picking of the objects 495 by controlling the robotic arm 404 according to the poses via the robot control computer 443. The scene data can be processed by the control module 442 that may implement a determined method to be performed in the sensor control computer 401. The sensor control computer 401 can include memory and input/output interfaces as known in the art. Contemplated is that the sensors 409A-409D can be configured help identify and determine that the operation of the tentacles 411 is progressing as intended. For example, the tentacles 411 grasp the target object 495 at a starting position located a bin 496 of objects when the multi-tentacle gripping system is so commanded. After the multi-tentacle gripping system is commanded to grasp the target object 495 from the bin 496 and before the multi-tentacle gripping system is commanded to move to a final position. Sensors 409A-409D generate data that identify a type of grip, a number of objects held by the tentacles 411, or both, such that upon the centralized control system receiving the sensor data. If that the type of grip, a single target object is grasped by the tentacles 411, or both, are determined that a position and/or an orientation of the target object corresponds to a predetermined criteria for the position and/or the orientation of the target object according to the set of command instructions, the centralized control system does not generate an alternate set of command actions. However, if after the centralized control system determines that the type of grip, the number of objects, or both, grasped by the tentacles 411 do not meet the predetermined criteria for the position and/or the orientation of the target object according to the set of command instructions. The centralized control system generates the alternate set of command actions, to move the tentacles 411 holding target object or number of objects, back to the starting position or to an alternate position.

Still referring to FIG. 4, the innovative tentacles 411 are particularly customizable to flexible assembly lines due to the high level of dexterous manipulation in combination with real-time sensors 409A-409D as noted above, as well as real-time tactile sensing embedded in the end tips (see 116 of FIG. 1C) of each tentacle (not shown). For example, upon receiving the real-time sensor data, the different shapes and poses of objects typically experienced in flexible assembly lines can easily be moved by the tentacles with high accuracy. Test results showed that the tentacles were operationally capable of sequentially gripping more than one type of object with a time period, gripping a M6 socket-head bolt with high accuracy, sequentially gripping next the casting that the same bolt screws into, as well as precisely grasping a M6 hex-head bolt. Whereas conventional grippers that grip the M6 socket-head bolt, typically cannot grip the casting that the same bolt screws into nor precisely grasp the M6 hex-head bolt.

At least one novel differentiating factor over conventional robot assemblies, is that the end tip (see 116 of FIG. 1C) can include embedded tactile sensors providing tactile sensing in combination with the above noted sensors 409A-409D. When combined, the real-time sensor data provided back to the centralized control system (see 300G of FIG. 3G) is processed and implemented in fractions of a second while operating, i.e. within flexible assembly lines. Further, if there are any detected errors or gripping problems picking up a target object by the tentacles, the centralized control system (see 300G of FIG. 3G) in real-time can correct the issues immediately, saving valuable operational time and production costs. This novel feature is especially important in view of today's manufacturing facilities increasing investments in incorporating robots with improved capabilities to operate in flexible assembly lines. This is expressed in McKinsey & Company Industrial Robotics Report on the insights into sector's further growth dynamics, in their Advanced Industries, July 2019 publication, that stated "*The investment increase across industries is mainly driven by the goal to decrease production cost. Investment is also motivated by the need for increased flexibility in production and improved capabilities of robots (see Exhibit* 5)." (see https://www.mckinsey.com/~/media/McKinsey/Industries/Advanced%20Electronics/Our%20Insights/Growth%20dynamics%20in%20industrial%20robotics/Industrial-robotics-Insights-into-the-sectors-future-growth-dynamics.ashx). Whereas, most conventional robot grippers have problems, including little or no tactile sensing, i.e. limiting their use for flexible assembly lines. At least one reason is that the designs for these conventional specialized gripper fingers are configured for high precision part grasping and grasp validation, however, these conventional devices are not operationally capable of gripping more than one type of object.

Still referring to FIG. 4, although, one set of tentacles are shown with supporting operating components, interchangeable sets of tentacles are contemplated, depending upon the user specific requirements, according to embodiments of the present disclosure. The different types of sets of tentacles can have different levels of stiffness, flexibility, different outer surface materials, different tentacle lengths, etc., all of which are described within this application, according to aspects of the present disclosure.

Another aspect of the systems and components of the present embodiments is that software or hardware, or some combination thereof, can be implemented via localized storage or through a cloud-based system. According to aspects of some embodiment, tentacles especially tentacles configured with embedded sensors introduce an amount of task flexibility that allows the grippers to remain useful in case of changes from the planned original task, whether predicted or unpredicted. Similarly, the conventional robots have a low level of capability to know if an actual assembly operation was successful or not, i.e. such as grippers grab is "GRIP OK" versus "NO OBJECT FOUND" versus "GRIP TOO TIGHT" versus "GRIP MARGINALLY LOOSE" versus "GRIP DOESN'T FEEL RIGHT". In order to overcome these above problems of the conventional robots, some embodiments of the present disclosure are configured with a mechanically robust general-purpose gripper end tips 1216 of FIG. 12A to FIG. 12C, that provide a full force set in pressure, translation, rotation, shear, etc., as noted above, that can be used, by non-limiting example, for flexible assembly lines.

FIG. 5A to FIG. 5D are pictures illustrating different gripping or grasping types by the multiple tentacles for different shaped objects that can be used in an industrial environments, such as a manufacture (MFG) packaging application for small parts or for a supply chain application for bin picking for sorting goods, according to some embodiments of the present disclosure.

Figure 5A:
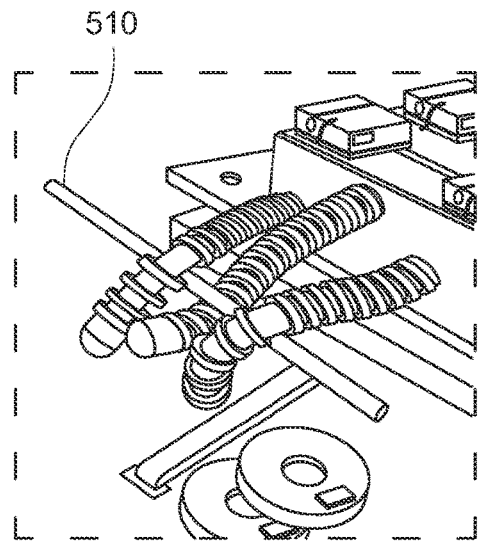
FIG. 5A to FIG. 5D are pictures illustrating different gripping or grasping types by the multiple tentacles for different shaped objects that can be used in an industrial environment, such as a manufacture (MFG) packaging application for small parts or for a supply chain application for bin picking for sorting goods, according to some embodiments of the present disclosure.
Figure 5B:
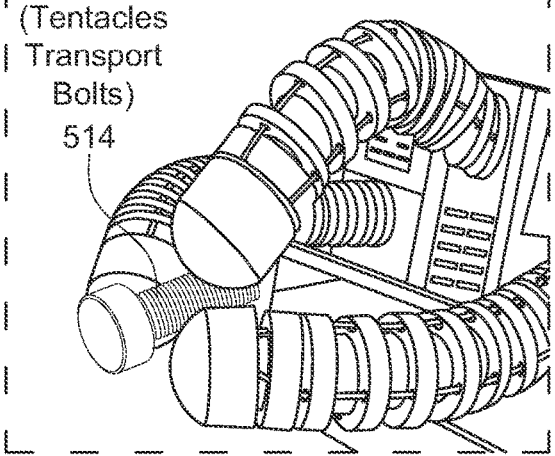
Figure 5C:
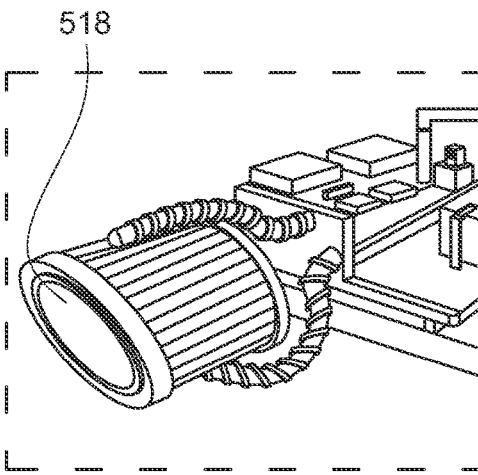
Figure 5D:
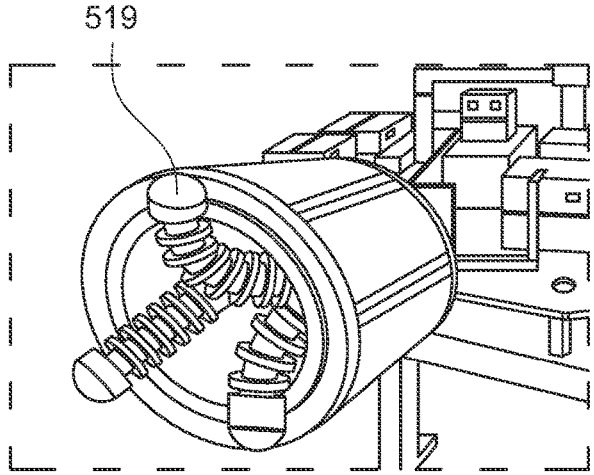

What was learned from experimentation is that the combination of the rigid cable-guide outer rings, the core tube of elastomer, the stack of ellipsoidal blue spacers, and the steel cabling produces a highly anisotropic mechanical metamaterial. In tension, it is highly inelastic due to the steel cables; in compression it behaves unconventionally—it neither compresses axially nor will it undergo tall-column Euler buckling (which typically creates a single sharp crease or kink) but instead bends in an essentially circular arc with complete recovery even when bent 180 degrees. In shear, and without cable tension, a tentacle deflects noticeably under it's own weight, but the tentacle sections themselves are resistant to second and higher order curvatures ("S" curves and other curves with more inflection points). Viewed another way, the elastomeric gripper is an analog computer finding the minimum elastomer energy configuration given the boundary conditions of the servo cable settings and the object being grasped. This view could lead directly to improved control algorithms for the gripper. Also realized the experimental performance results showed that the gripper system provided a superior amount of grip strength and adaptability resulting from the coordinated central control and the use of a mechanical metamaterial. Other experimental performance results showed a high amount of tensile and compressive strength, while remaining supple in lateral directions. Further the central controller provided a high amount strength coordinated tentacle grasps, and when compared to a similar conventional gripper of the same size and configuration, the gripper of the present disclosure performance results provided stronger than conventional parallel grippers configured with traction-rubber grip jaws, was well as out performed in an amount of types and number of grasps for grasping objects far smaller than a minimum tentacle bend radius. For example, FIG. 5A shows the multiple tentacles grasping a pencil 510. FIG. 5B shows the multiple tentacles grasping a bolt 514. FIG. 7C shows the multiple tentacles grasping car air filter 518 using a first grasp grip. FIG. 5D shows the multiple tentacles grasping another car air filter 519 using a second grasp grip.

Figure 6A:
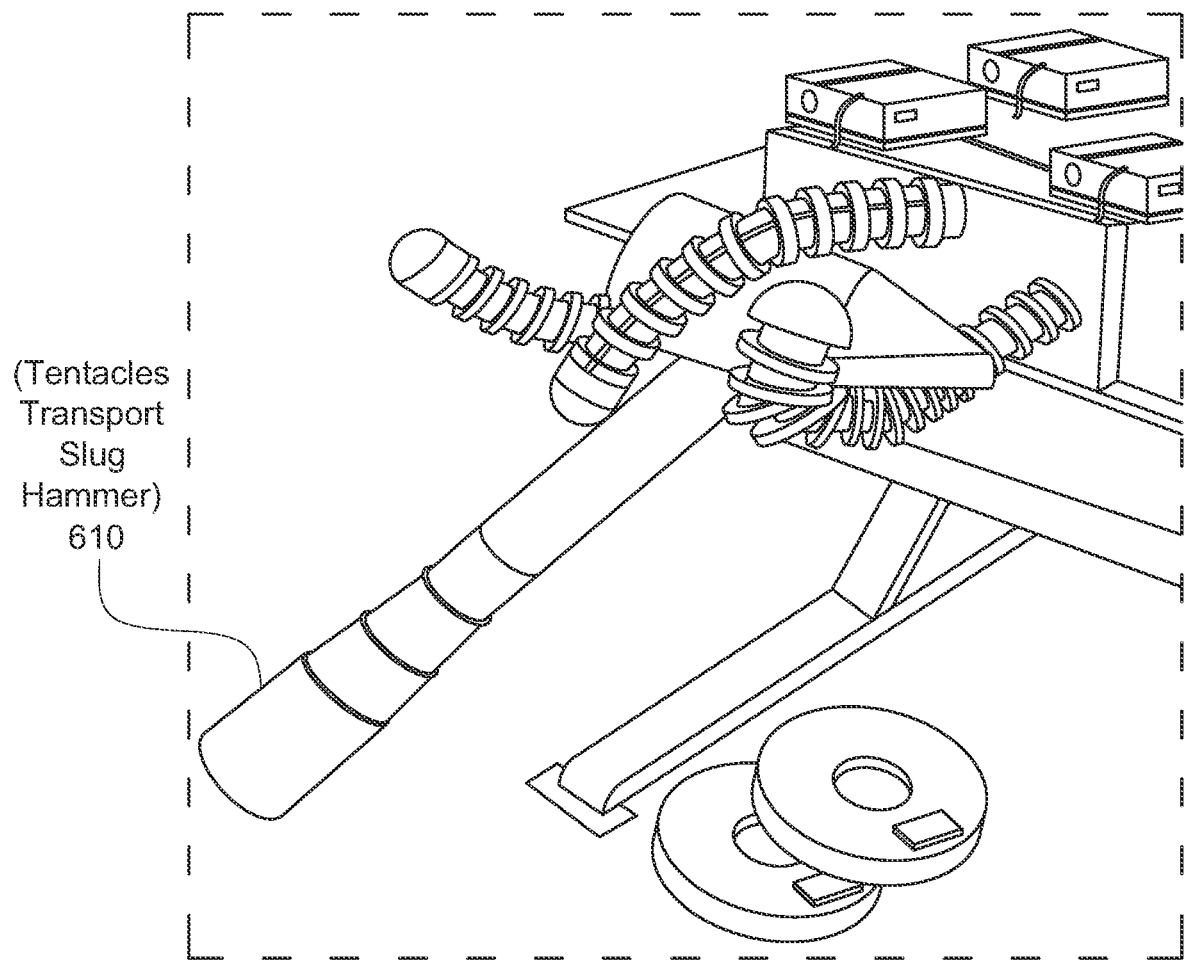
FIG. 6A is a picture illustrating another gripping or grasping type by the multiple tentacles for a heavy object such as a slug hammer, according to some embodiments of the present disclosure.

FIG. 6A is a picture illustrating another gripping or grasping type by the multiple tentacles for a heavy object such as a slug hammer 610, according to some embodiments of the present disclosure.

FIG. 6B is a schematic illustrating a table of gripping strength test results for a test gripper having three tentacles, two sections per tentacle, having fully actuated (12 DoF), +/−120° flex per tentacle section, and 30 mm minimum interior flex radius, the tested gripping strengths include grasp load capacity, initial and maximum current draws, and failure modes determined for several grasps, according to some embodiments of the present disclosure. For example, the multi-tentacle gripper can include many types of grips for the same multi-tentacles including: (a) distal wrap; (b) proximal hugging wrap; (c) reverse distal wrap; (d) internal expanding wrap; (e) internal expanding pinch; (f) distal pinch (external distal pinch); (g) proximal pinch. Further, the multi-tentacle gripper can grasp objects ranging from very small objects such as six millimeter (M6) size bolt (or a bolt that is less than ¼ of an inch in size), and up to a very large object such as an industrial shop vacuum cleaner filter (or objects sized at 150 mm or about 6 inches) in a encircling grip.

The grasp load capacity, initial and maximum current draws, and failure modes were determined for several grasps are tabulated in Table 1. Testing was done by closing the tentacles around a test object in each type of grasp and then pulling the test object either straight out (axial) or straight down (radial) from the gripper via a calibrated force scale. With the exception of distal pinches, pullout strength varied from 4 to 18 kg, 36 to 160 N (8 to 36 lb). For comparison, a "classic" parallelogram-grip robot gripper with friction-rubber jaws, actuated with two of the same type HS-805BB servos achieves only ~15% to 25% of this grip strength—1-3 kg lift, 10-30 N (2-6 lb) axial pull-out strength on similar test objects. Note that some high-performing grasps such as the proximal hug wrap, the reverse distal wrap and the internal counter-expanding wrap require coordinated central control and "unconventional" positioning of the tentacles. Essentially some tentacles take a weaker grasp in order to obtain a stronger grip for the tentacle array, including bracing one tentacle against another. These cases exemplify where a local configuration optimum grip is not the global optimum grip and centralized (rather than distributed) control is a requirement. Noted is that some grasp modes we would expect to be very strong (such as boa constrictor full wraps) are not possible with only two sections of tentacle with +/−1200 bend and 30 mm minimum radius per section (such as wrapping a 10.3 mm diameter test object); therefore the grasp strengths listed should be considered as lower bounds.

Figure 7:
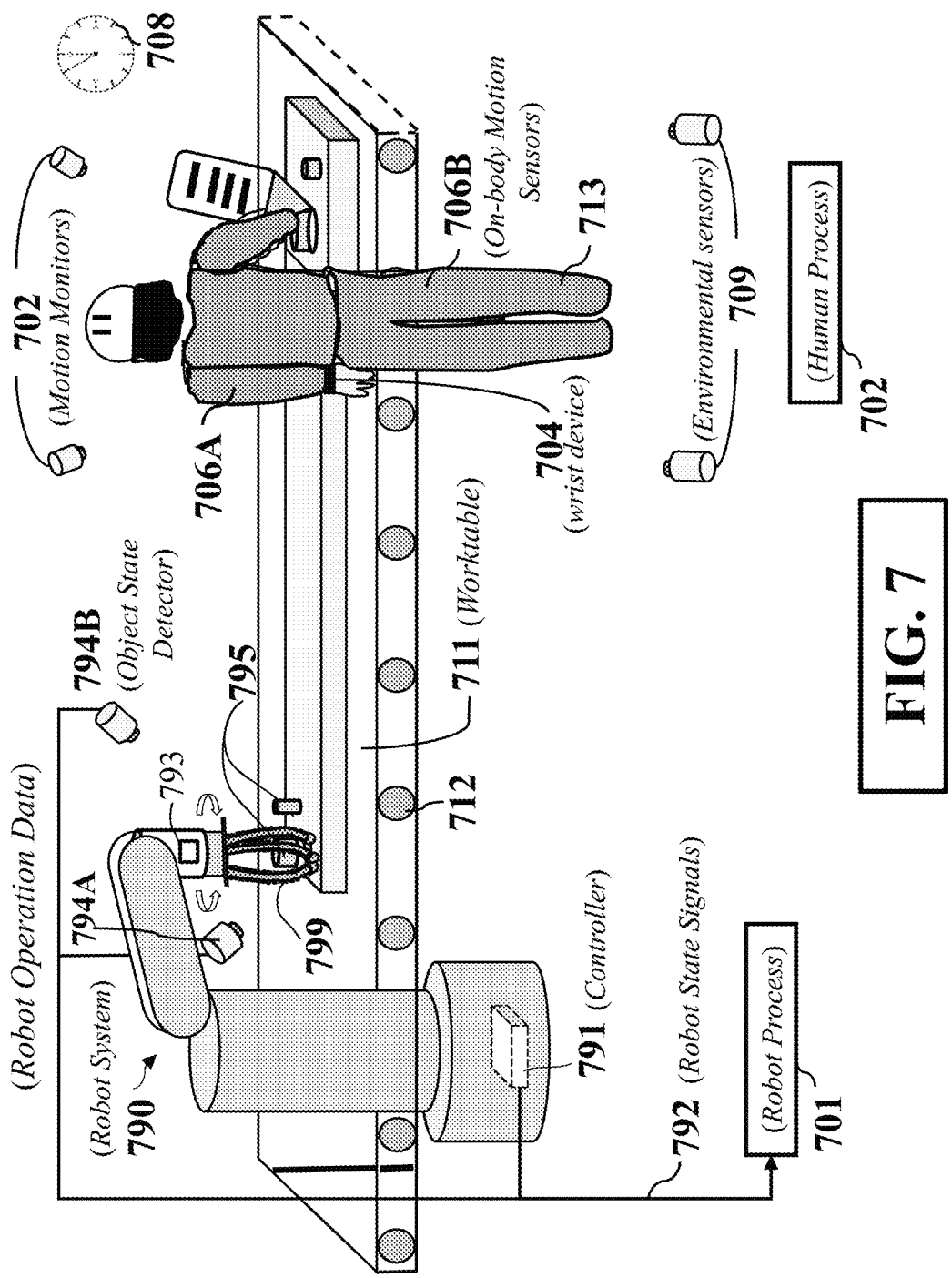
FIG. 7 is a schematic diagram illustrating a robot system including incorporating the soft robot gripper system along with elastomeric sensors on the palm base plate, and a human worker, working together as a team, executing a task in an assembly line of a discrete manufacturing process, according to some embodiments of the present disclosure.

FIG. 7 is a schematic diagram illustrating a robot system including incorporating the soft robot gripper system along with elastomeric sensors on the multiple tentacle base plate or palm base plate, and a human worker, working together as a team, executing a task in an assembly line of a discrete manufacturing process, according to some embodiments of the present disclosure. For example, the soft robot tentacle system can be incorporated into an assembly line that includes multiple stations, such that some stations can include at least one task to be completed by at least one soft robot tentacle system and at least one task completed by a human, or at least one task completed by a combination of a human working together with the soft robot tentacle system.

Still referring to FIG. 7, the robot system 790 includes a controller 791, a robot state detector, for example a positional encoder 793, wherein the positional encoder 793 can produce robot state signals 792. The robot system 790 can also include an object state detector for example a camera 794A, 794B, wherein the camera 794A, 794B can produce object state signals of an object 795 to be manipulated by the robot system 790 in a workspace or conveyor 712 of a worktable 711. For example, when measuring for grasp quality during a predetermined testing period, a test centralized control system obtains test sensor data that determines a state of both the tentacles and the object in real-time to determine the quality of the grasped object. For example, real-time test sensor data is generated that can include data of position and velocity of points along the tentacle, i.e. joint like points, that can be used to determine a state feedback, which can be used to compare to predetermined sets of commands, or be incorporated with other functions associated with optimizing grasps, i.e. frictional forces in certain directions, stabilizing control theories, computing torques. Note, that moving bags of objects can include further consideration, i.e. calculations, due to the bag dimensions, size, weight, etc., and that the tentacles are grasping a part of a bag while moving the bag from a start position to a final position with a particular environment. Upon completion of many tests' periods, at some later point in time a predetermined grasping threshold may be obtained based on the specific testing parameters, i.e. type of object, the object characteristics and aspects, etc.

Wherein the robot system 790 assists at least one human worker 713 in completing at least one task on the worktable 711, such that the workspace or conveyor is capable of moving in a forward direction and a reverse direction in order to assist either the robot or human worker in completing the task. Note that these components 711-712 and 790-794 are here represented as an example but they might vary for different applications since the embodiment of the present disclosure is robust to different applications. In addition, the robot operational data can optionally, depending upon a user specific interest, be sent or received wirelessly to a robot learning process 701.

Further, the human worker 713 can have sensors for gathering data including a wrist device 704, motion monitors 702, on-body motion sensors 706A, 706B, time devices 708 and environmental sensors 709. The data from these devices facilitates the learning process for the models specific to the human worker. These sensors all together are an example of the human state detector. The human states are considered together with the state of the object to be manipulated 795 and with the state of the robot system 790 to learn the control policy of the robot. Experimental Engineered Tentacles An experimental gripper included tension springs and a constant-length clevis-joint robot arm with four independent 2 DoF sections to achieve a kinematically predictable and controllable robot arm including a wrap-grasping ability similar to an elephant's trunk. Unfortunately, this single tentacle approach/design could not grasp objects smaller in diameter than a diameter of the tentacle itself, even when drive to a maximum curvature wherein an inner radius equals zero, i.e. which means that the gripper could not lift a bolt from a surface of a workspace, or grasp a sphere shaped object smaller than the diameter of the tentacle (all such grasps of less than 270 degrees can be demonstrated to be kinematically unstable grasps). Another experimental design of an automatic soft-robotic and biomimetic grasping considered for grasping was arranged to grasp based object recognition, however, the actual gripping element had a 1-DoF robotic pincer or a 1-DoF pneumatic soft finger, which later learned to not be a high enough DoF tentacle. Thus, what was learned is that there needs to be a higher DoF for the embodiments of the present disclosure.

Another experimental gripper included constructing a biomimetic air-driven tentacle robot arm of three 2-DoF sections, terminating with a 1 DoF gripping tentacle with two rows of vacuum suckers to prove enhanced grab given the single tentacle. However, what was learned is that the vacuum suckers could grasp some larger objects, however, the elephant trunk limitations remained preventing an ability to grasp objects smaller than the trunk diameter. Thus, upon further testing this approach failed to meet performance requirements set for operation performance thresholds for some of the embodiments of the present disclosure and were not further tested. Some other experimental devices were analyzed and tested using multi-fingered single-link rod-fingered gripper designs that, while highly underactuated, prevented inter-finger slack or tension interchange by placing separate per-finger compliance elements in parallel (rather than the more series arrangement), thereby preventing inter-finger crosstalk and making a more stable grip. Thus, based on these results such experimental designs were not furthered for the present disclosure.

Other experimental grippers included a design for a series of cable-driven continuum tentacle robot arms with coil compression spring cores (pseudo-hydrostats) yielding 3 DoF, so as to allow for bending in two directions, plus a change in length. However, what was learned from these experimental gripper is that continuous uniform deformation as supplied by a tentacle with three degrees of freedom (DoF) has a relatively small set of grasps (encircling and pinching grasps), much more similar to a conventional 1 DoF gripper system, and does not nearly have the flexibility as a 12 DoF system. For example, a 3 DoF multi-tentacle gripper system cannot perform a recurve distal wrap (see FIG. 6B) or a self-bracing grasp such as an internal counter expanding wrap (see FIG. 6B).

Degree of Flexibility for Tentacle Components Based on Material Type

Also learned from experimentation is that an amount or a degree of flexibility of the components of the tentacles (i.e. tube sections, tube connector, ring and spacer), can affect a level of performance of the tentacles' cable transmission mechanism. Such that a higher degree of flexibility of the tentacle components appeared to reduce a level of bendability, a level of an applied gripping force, etc., in regard to an operational performance level during the tentacle operation, among other aspects. During experimentation several test embodiments were tested with an upper tube section (upper tube, rings with spacers) and the tube connector of tentacle having a higher degree of flexibility than the lower tube (lower tube, rings with spacers). Conversely, one set of test embodiments included the lower tube section and the tube connector of the tentacle having a higher degree of flexibility than the upper tube section. Another set of test embodiments included a high level of flexibility for both the lower and upper tube section and the tube connector. The materials for each component in the tube sections (tube itself, rings and spacers) were replaced with different degrees of flexibility, as well as the tube connector materials, in order to identify optimal tentacles performance based upon predetermined optimal tentacles performance thresholds determined by tentacle designers of the present disclosure. Some test experiments included varying degrees of stiffness and flexibility for the ring versus the spacer in the guide ring design. Some test results showed that having a stiffer material for the ring and a less stiff material for the spacer illustrated an improved performance level. Further, some test results showed that having a less flexible material for the ring and a more flexible material for the spacer illustrated an improved performance level. As noted in FIG. 2D to FIG. 2I, the degrees of tentacle flexibility based upon guide ring geometry can affect performance, wherein test experiments included changing a geometry of the guide rings to obtain different levels of flexibility of the tentacles to further optimize tentacles performance.

Figure 8A:
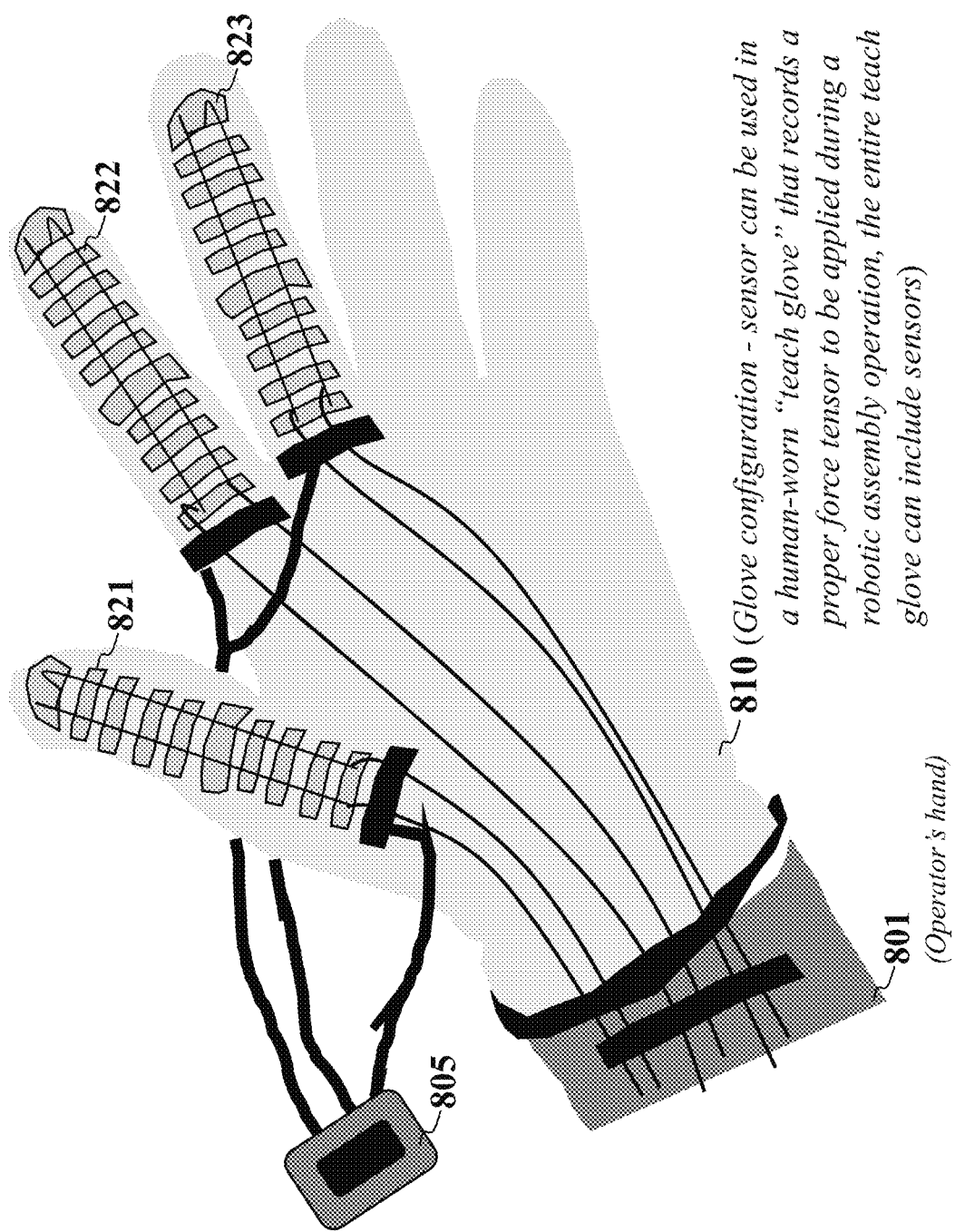
FIG. 8A is an illustrating an embodiment of tentacles attached to a human-worn "teach glove", used to create a set of movement instructions specific to each pose of an object, in order to move the object, such that the set of movement instructions can be stored in a movement instruction database, and that each object can include multiple poses, according to some embodiments of the present disclosure.

FIG. 8A is an illustrating an embodiment of tentacles attached to a human-worn "teach glove", used to create a set of movement instructions specific to each pose of an object, in order to move the object, such that the set of movement instructions can be stored in a movement instruction database, and that each object can include multiple poses, according to some embodiments of the present disclosure. For example, tentacles 821, 822, 823 attached to a human-worn "teach glove" 810, can be used to create a set of movement instructions specific to each predetermined movement action for each object of many objects, to move the object, such that the set of movement instructions can be stored in the movement instruction database, according to some embodiments of the present disclosure. Some benefits/advantages of the multiple tentacles 821, 822, 823 being used in a human-worn "teach glove" 810, is that the movements of the multiple tentacles 821, 822, 823 of the human wearing the "teach glove" 810 can be recorded along with a proper force tensor to be applied during a later robotic assembly operation.

Still referring to FIG. 8A, optionally, the robot system of the present disclosure can be used with other robot devices via a network, so as to be able to accomplish different coordinated human-like, tasks, that can be stored in a movement instructions database and later accessed and utilized. For example, the other robot device may include devices of which the robot system of the present disclosure can be implemented into, so as to operate cohesively to accomplish a task (see FIG. 4 the robot assembly device having a robot control computer 403, robot control module 402 and robot arm 404 that is coordinated with the multiple tentacles 408 of the present disclosure).

As noted above, a teaching glove 810 can be fitted to a human operator 301 to provide control by manipulating a set of sensors 821, 822, 823 attached to the teaching glove 801. The human operator 801 movements via the teaching glove 810 is sensed to provide sets of signals to be converted to a sequence of movements or movement instructions to complete a task. The robot system of the present disclosure in the network of robotic devices can accomplish a portion of a human-like task in a specific environment while the remaining robotic devices in the network of robotic devices may accomplish the remaining portions of the human-like task(s) in the specific environment. In such an arrangement, the sequence of movements or movement instructions can be converted to sets of sequential movement instructions that is stored in a library or movement instructions database. The robot system of the present disclosure could then carry out the motions as though they were consistent with the operator motions, via accesses the stored set of movement instructions or program, and if working with other robotic device, the robot system can act in a coordinated fashion with the other robotic devices to complete human-like tasks.

For example, the centralized robot control system 300G of FIG. 3G can include a plurality of control sensors 821, 822, 823 of FIG. 8A, to sense motion from the operator's hand 801 wearing the teaching glove 810. When the operator's hand 801 moves, the control sensors 821, 822, 823, sense the motion and generate an output signal representative of the motion. Control sensors 821, 822, 823, for example, may be accelerometers or digital positioning devices that provide three-dimensional coordinates for the sensors. As another example, the sensors 821, 822, 823 may measure angular rotation or pressure or force of the operator's 801 joints. The plurality of control sensors 821, 822, 823 are attached to the teach glove 810 that the operator 801 is wearing. For example, a radar or LIDAR, or other 3D depth-sensing device may be placed a few feet from the operator and pointed towards the operator to sense a portion of the motion. Various combinations of types of sensors can be used to sense the motion of the operator 801. The centralized robot control system 300G of FIG. 3G can be communicatively connected to the plurality of control sensors 821, 822, 823 and convert the motion sensed by the plurality of control sensors 821, 822, 823 into a collective set of commands. The collective set of commands actuate the multiple tentacles of the robot system of the present disclosure.

Figure 8B:
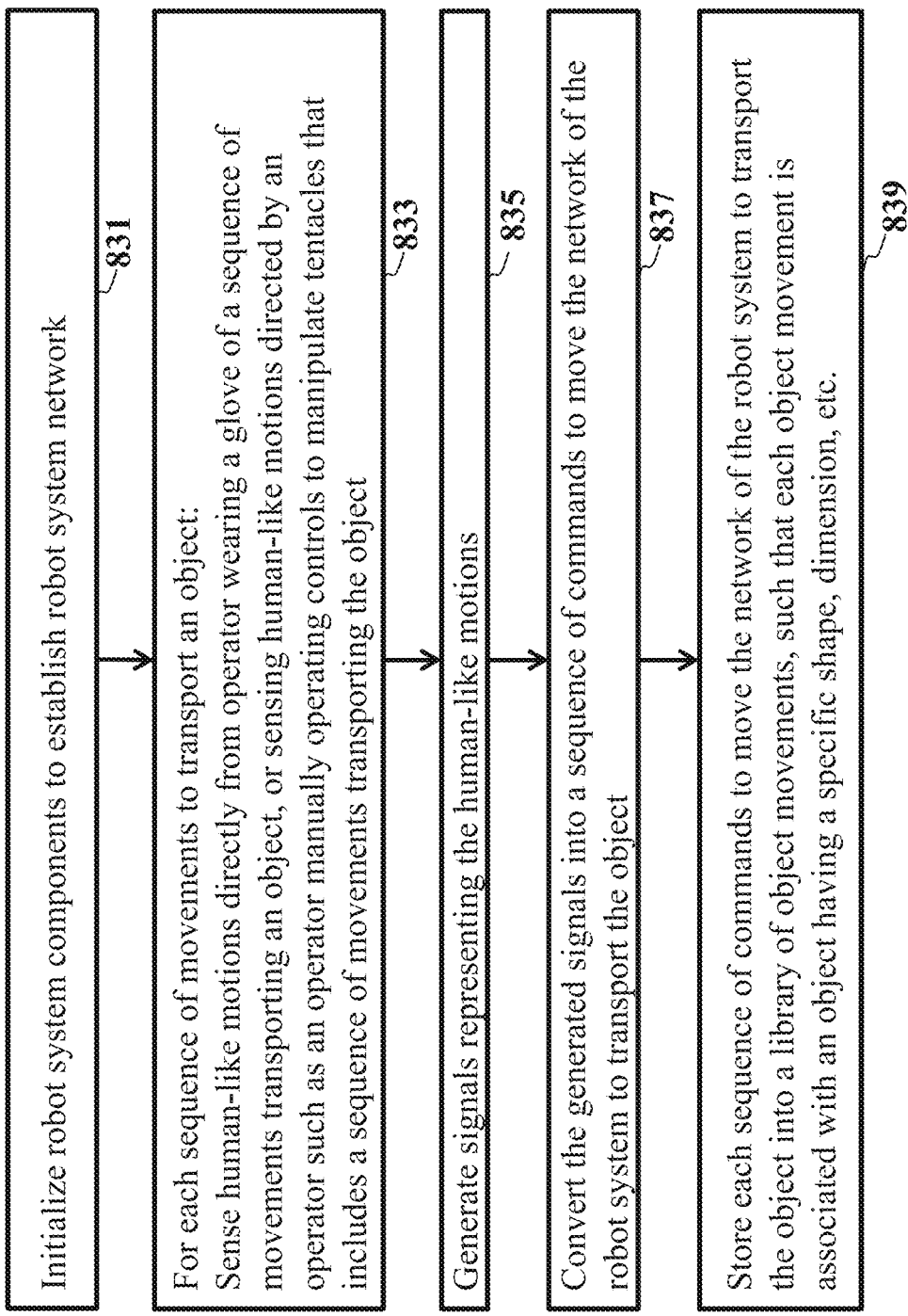
FIG. 8B is a block diagram illustrating some method steps using the human-worn "teach glove" of FIG. 8A, to create the set of movement instructions for each pose of the object, such that each pose has an associated set of movement instructions, according to some embodiments of the present disclosure.

FIG. 8B is a block diagram illustrating some method steps using the human-worn "teach glove" of FIG. 8A, to create the set of movement instructions for each pose of the object, such that each pose has an associated set of movement instructions, according to some embodiments of the present disclosure. Step 831 of FIG. 8B includes Initialize robot system components to establish robot system network. Step 833 of FIG. 8B includes that for each sequence of movements to transport an object, can include the step of sensing human-like motions directly from operator wearing a glove of a sequence of movements transporting an object, or sensing human-like motions directed by an operator such as an operator manually operating controls to manipulate tentacles that includes a sequence of movements transporting the object. Step 835 of FIG. 8B includes generating signals representing the human-like motions. Step 837 of FIG. 8B includes converting the generated signals into a sequence of commands to move the network of the robot system to transport the object. Step 839 of FIG. 8B includes storing each sequence of commands to move the network of the robot system to transport the object into a library of object movements, such that each object movement is associated with an object having a specific shape, dimension, etc.

Optionally some other steps of using the teaching glove method that senses motion from an operator wearing a teaching glove, can include generating one or more signals representative of at least a portion of the motion. Converting the one or more signals into a collective set of commands or movement instructions to actuate the multiple tentacles, or actuate the multiple tentacles and other devices within a network of robotic devices, wherein the collective set of commands or the movement instructions is functionally equivalent to the motion. Communicating the collective set of instructions or the program to the centralized control system and the network of robotic devices such as a robot assembly device configurable to operate with the robot system. Contemplated is that when communicating the collective set of commands, the communicating can be to each robotic device in the network of robotic devices a respective subset of commands from the collective set of commands, i.e. robot assembly device. If desired by a specific user requirement, the network of robotic devices may have a master robotic device and one or more slave robotic devices, such that the master robotic device can receives the collective set of commands or movement instructions, and then distribute the collective set of commands or movement instructions to the network of robotic devices, i.e. robot assembly device (see FIG. 3A).

FIG. 9 is a block diagram illustrating some components of another centralized controller system used for implementing some methods associated with the soft robot gripper system, according to some embodiments of the present disclosure. For example, centralized controller system 900 can include a hardware processor 971 in communication with a sensor 972 or sensors, that collects data including data of an environment 973. The sensor data can include data related to robot, vehicle, machine, etc. and similar types of data or data associated with trajectory optimization techniques for dynamical systems with nonlinear constraints. Further, the sensor 972 can convert a video or camera input into the signal data. The hardware processor 971 can be in communication with a computer storage memory, i.e. memory 979, such that the memory 979 includes stored data, including algorithms, instructions and other data, that can be implemented by the hardware processor 971. For example, stored in the memory can include a multi-link Dynamic Model, a nonlinear Optimization program and an objective function.

Still referring to FIG. 9, sensor data can be stored in the memory 979 which can be obtained from at least one sensor in the environment via a wired connection or a wireless connection, the sensor data is stored in the memory via a transceiver configured to output data and to receive data, such that after each time interval, the sensor data is updated by the at least one sensor. Also, stored in the memory can be robot, vehicle and machine operational and dynamics data that can include robot arm information including a model of the robot arm that allows for simulation of movements of the robot arm, along with operational control inputs such as torques applied by the motors via the robot drive for moving each joint of the robot arm. The hardware processor 971 can be connected a control module 978 which is connected to the robot control computer 980. The robot control computer 980 can communicate back with the control module via 979. The robot control computer 980 is connect to the soft robot gripper system 982, wherein the soft robot gripper system 982 can communicate to and receive information from the robot control computer 980, as well as optionally be connected directly back to the robot control computer 980.

Optionally, the hardware processor 971 can be connected to a network 977, that is in communication with a data source(s) 998, computer device 984, a mobile phone device 985 and a storage device 986. Also, optionally, the hardware processor 971 can be connected via the network 977 to a network-enabled server (not shown) that is connected to a client device (not shown). The hardware processor 971 can optionally be connected to an external memory device 991, a transmitter 992 to a controller 994. A transceiver can be connected via an expansion bus interface 995 to the hardware processor 971. Some types of output received by the transceiver 996 can be related to a user's intended interested in receiving an answer to a request (received by the transceiver 996) about computed trajectories along the path (obtained from the methods of the present disclosure) which could be displayed on the user's one or more display device, such as a monitor or screen, and/or inputted into an other computer related device for further analysis, etc.

Still referring to FIG. 9, contemplated is that the hardware processor 971 can include two or more hardware processors depending upon the requirements of the specific application, wherein the processors can be either internal or external. Certainly, other components may be incorporated depending upon a user/operate specific operation needs. It is possible the network 977 can include, by non-limiting example, one or more local area networks (LANs) and/or wide area networks (WANs). Wherein the networking environments can be similar to enterprise-wide computer networks, intranets and the Internet. Contemplated for all the components mentioned that there can be any number of client devices, storage components, and data sources employed within the systems of the present disclosure. Each may comprise a single device or multiple devices cooperating in a distributed environment. Further, the data source(s) 983 may comprise data resources for training a network. For example, in an embodiment, training data can be stored in the storage 986. The training data can also include signals of other environments. Data source(s) 983 may also comprise data resources for training a network. The data provided by data source(s) 983 may include other data, such as other sensor related data corresponding to the environment, robot arm and the like.

Still referring to FIG. 9, some data in data source(s) 983 can be provided by one or more feedback loops. Other examples of data sources may include by way of example, and not limitation, various sources including streaming video, web queries, mobile device camera or other information, web cam feeds, smart-glasses and smart-watch feeds, customer care systems, security camera feeds, web documents, catalogs, user feeds, SMS logs, instant messaging logs, spoken-word transcripts, gaming system user interactions such as voice commands or data (e.g., data can include robot, vehicle, environmental, etc. types of data or data associated with trajectory optimization techniques for dynamical systems with nonlinear constraints). Specific data source(s) 983 used may be determined based on the application including whether the data is a certain class of data (e.g., data relating to thresholds, performance, safety, etc. associated with robot, vehicle, environmental, etc. types of data or data associated with trajectory optimization techniques for dynamical systems with nonlinear constraints), or general (non-class-specific) in nature.

The third-party devices 984, 985, which can comprise of any type of computing device including a computer device 984 or a mobile device 985. Contemplated is that a user device may be embodied as a personal data assistant (PDA), a mobile device, such as a smartphone, smart watch, smart glasses (or other wearable smart device), augmented reality headset, virtual reality headset. Further, the user device could be a laptop, such as a tablet, remote control, entertainment system, vehicle computer system, embedded system controller, appliance, home computer system, security system, consumer electronic device, or other similar electronics device. In one embodiment, the client device is capable of receiving input data such as audio and information usable by methods and systems of the present disclosure. For example, the third party device may be data i.e. data that is associated with robot, vehicle, environmental, etc. or similar types of data or data associated with trajectory optimization techniques for dynamical systems with nonlinear constraints), a microphone or line-in for receiving audio information, a camera for receiving video or image information, or a communication component (e.g., Wi-Fi functionality) for receiving such information from another source, such as the Internet or a data source 3.

Still referring to FIG. 9, regarding the storage 986, the storage 986 can store information including data, computer instructions (e.g., software program instructions, routines, or services), and/or models used in embodiments of the technology described herein. For example, the storage 986 can store data from one or more data source(s) 983, one or more deep neural network models, information for generating and training deep neural network models, and the computer-usable information outputted by one or more deep neural network models.

FIG. 10 is a schematic diagram illustrating a centralized controller system that can be used for implementing some methods associated with the soft robot gripper system, according to some embodiments of the present disclosure. For example, the alternate centralized controller system can be a computing apparatus that represents various forms of digital computers, such as laptops, desktops, workstations, personal digital assistants, servers, blade servers, mainframes, and other appropriate computers.

The centralized controller system 1000 can include a power source 1008, a processor 1009, a memory 1010, a storage device 1011, all connected to a bus 1050. Further, a high-speed interface 1012, a low-speed interface 1013, high-speed expansion ports 1014 and low speed connection ports 1015, can be connected to the bus 1050. Also, a low-speed expansion port 1016 is in connection with the bus 1050. Contemplated are various component configurations that may be mounted on a common motherboard, by non-limiting example, 1030, depending upon the specific application. Further still, an input interface 1017 can be connected via bus 1150 to an external receiver 1006 and an output interface 1018. A receiver 1019 can be connected to an external transmitter 1007 and a transmitter 1020 via the bus 1050. Also connected to the bus 1050 can be an external memory 1004, external sensors 1003, machine(s) 1002 and an environment 1001. Further, one or more external input/output devices 1005 can be connected to the bus 1050. A network interface controller (NIC) 1021 can be adapted to connect through the bus 1050 to a network 1022, wherein data or other data, among other things, can be rendered on a third-party display device, third party imaging device, and/or third-party printing device outside of the computer device 1000.

Contemplated is that the memory 1010 can store instructions that are executable by the centralized controller system 1000, historical data, and any data that can be utilized by the methods and systems of the present disclosure. The memory 1010 can include random access memory (RAM), read only memory (ROM), flash memory, or any other suitable memory systems. The memory 1010 can be a volatile memory unit or units, and/or a non-volatile memory unit or units. The memory 1010 may also be another form of computer-readable medium, such as a magnetic or optical disk.

Still referring to FIG. 10, a storage device 1011 can be adapted to store supplementary data and/or software modules used by the computer device 1000. For example, the storage device 1011 can store historical data and other related data as mentioned above regarding the present disclosure. Additionally, or alternatively, the storage device 1011 can store historical data similar to data as mentioned above regarding the present disclosure. The storage device 1011 can include a hard drive, an optical drive, a thumb-drive, an array of drives, or any combinations thereof. Further, the storage device 1011 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1009), perform one or more methods, such as those described above. The system can be linked through the bus 1050 optionally to a display interface or user Interface (HMI) 1023 adapted to connect the system to a display device 1025 and keyboard 1024, wherein the display device 1025 can include a computer monitor, camera, television, projector, or mobile device, among others.

Still referring to FIG. 10, the centralized controller system 1000 can include a user input interface 1017 adapted to a printer interface (not shown) can also be connected through bus 1050 and adapted to connect to a printing device (not shown), wherein the printing device can include a liquid inkjet printer, solid ink printer, large-scale commercial printer, thermal printer, UV printer, or dye-sublimation printer, among others. The high-speed interface 1012 manages bandwidth-intensive operations for the computing device 1000, while the low-speed interface 1013 manages lower bandwidth-intensive operations. Such allocation of functions is an example only. In some implementations, the high-speed interface 1012 can be coupled to the memory 1010, a user interface (HMI) 1023, and to a keyboard 1024 and display 1025 (e.g., through a graphics processor or accelerator), and to the high-speed expansion ports 1014, which may accept various expansion cards (not shown) via bus 1050. In the implementation, the low-speed interface 1013 is coupled to the storage device 1011 and the low-speed expansion port 1015, via bus 1050. The low-speed expansion port 1015, which may include various communication ports (e.g., USB, Bluetooth, Ethernet, wireless Ethernet) may be coupled to one or more input/output devices 1005, and other devices a keyboard 1024, a pointing device (not shown), a scanner (not shown), or a networking device such as a switch or router, e.g., through a network adapter.

Still referring to FIG. 10, the centralized controller system 1000 may be implemented in a number of different forms, as shown in the figure. For example, it may be implemented as a standard server 1026, or multiple times in a group of such servers. In addition, it may be implemented in a personal computer such as a laptop computer 1027. It may also be implemented as part of a rack server system 1028, and an external power supply 1029. Alternatively, components from the computing device 1000 may be combined with other components in a mobile device (not shown), such as a mobile computing device having different component configuration arranged for mobile devices.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A device, comprising:
   tentacles, each tentacle includes lower and upper elastic members connected by an elastic connector having a center thru-hole and transfer channels in a center portion thereof, wherein each elastic member includes guide discs, and each guide disc includes a ring with passthrough holes, and a spacer located in a donut hole of the ring that has passthrough holes, while the ring and spacer passthrough holes collectively define cable pathways, wherein the lower elastic member is configured with guide rings having varying thicknesses, such that there are a larger number of smaller thickness sized guide rings than a total number of both medium and large sized thickness guide rings; and
   cables having proximal ends coupled to actuators outside of the lower elastic member extend from the actuators through apertures of a controllable palm baseplate located at a proximal end of the lower elastic member.

2. The device of claim 1, wherein each transfer channel includes a geometric feature having an entry aperture with a cable entry path tangential to an inner surface of the center thru-hole, and an exit aperture with a cable exit path parallel to a center axis of the connector.

3. The device of claim 2, wherein the cable entry path and the cable exit path both minimize an amount of transmission friction and minimize an amount of cable flex fatigue while the cables are in motion during an operation of the tentacle.

4. The device of claim 2, wherein the geometric feature is based on obtaining a distance measured from a passthrough hole of a guide disc to a transfer channel, and using the measured distance and a pair of arcs of constant and equal radius, to construct the cable entry path and the cable exit path, to determine an optimal transfer channel configuration.

5. The device of claim 4, wherein a maximization of the radius of the pair of arcs within the measured distance, results in a minimization of an amount of side load of the cable generated from a motion of the cables, and concurrently minimizes an amount of transmission friction and an amount of cable flex fatigue during an operation of the tentacle.

6. The device of claim 2, wherein the cable entry path extends at an acute angle from a bottom surface to a top surface of the elastic connector, and the cable exit path extends at an acute angle from the top surface to the bottom surface.

7. The device of claim 2, wherein each entry aperture of the transfer channels is approximately aligned with the lower spacer passthrough holes of a distal lower guide ring, and each exit aperture of the transfer channels is approximately aligned with upper ring passthrough holes of a proximal upper guide ring.

8. The device of claim 1, wherein one or more guide discs include convex bottom and top surfaces and rounded peripheral edges or convex edges.

9. The device of claim 1, wherein materials forming the guide rings includes a different stiffness for the rings than a stiffness of material forming the spacers.

10. The device of claim 1, wherein the palm baseplate is controllable along an X axis corresponding to a left and right direction, and an Y axis corresponding to a forward and a backward direction.

11. The device of claim 1, wherein a set of lower cables extend through the lower ring passthrough holes to couple to a distal lower guide disc, and a set of upper cables extend through the lower spacer passthrough holes, through the transfer channels to the upper ring passthrough holes to couple to a distal upper guide ring, and an end cap is attached to the distal end of the upper member.

12. The device of claim 1, wherein the smaller thickness sized guide discs optimize flexibility of the tentacle when compared to the larger sized thickness sized guide ring which places a maximum load capability of the tentacle, and the medium thickness sized guide disc which places flexibility and load capabilities at equal levels of the tentacle.

13. The device of claim 1, wherein the tentacles include three (3) tentacles that have twelve (12) independently actuated degree of freedom, with tension cables having a 120° of an amount of flex range for each lower and upper elastic member, such that tentacles provide multiple grip modes including internal expanding distal pinch grips, internal counter expanding wraps, proximal hug wraps and reverse distal wraps.

14. The device of claim 1, further comprising:
   a partial glove device fitted to the tentacles and attached to the palm base plate, such that the partial glove device includes stiffening support rib portions axially aligned with some lower member guide rings, wherein surfaces contacting the target object by the partial glove device include one or more gripping features positioned between each tentacle.

15. A gripper device, comprising:
   tentacles, each tentacle includes lower and upper members connected by a connector, each member has guide discs attached along the member to maintain spacing between the guide discs, and each guide disc includes a ring with passthrough holes, and a spacer located in a donut hole of the ring that has passthrough holes, while the ring and spacer passthrough holes collectively define cable pathways, such that the passthrough holes for each ring are equally spaced around a periphery of the ring, wherein the connector includes a center thru-hole and transfer channels in a center portion, each transfer channel includes a geometric feature having an entry aperture with a cable entry path tangential to an inner surface of the center thru-hole, and an exit aperture with a cable exit path parallel to a center axis of the connector;
   cables having proximal ends coupled to actuators outside of the lower member that extend from the actuators through apertures of a controllable palm baseplate located at a proximal end of the lower member, such that a set of lower cables extend through the lower ring passthrough holes to couple to a distal lower guide disc, and a set of upper cables extend through the lower spacer passthrough holes of the lower guide rings, through the transfer channels to the upper ring passthrough holes to couple to a distal upper guide ring, wherein an end cap is attached to the distal end of the upper member; and a partial glove device attached to the tentacles and the palm base plate, such that the partial glove device includes stiffening support rib portions axially aligned with some lower member guide rings.

16. The gripper device of claim 15, wherein each entry aperture of the transfer channels is approximately aligned with the lower spacer passthrough holes of a distal lower guide ring, and each exit aperture of the transfer channels is approximately aligned with upper ring passthrough holes of a proximal upper guide ring, wherein one or more guide discs include convex bottom and top surfaces and rounded peripheral edges or convex edges, and a material forming the guide rings has a different flexibility than a flexibility of a material forming the spacers.

17. The gripper device of claim 15,
wherein the partial glove device is formed from a material having an amount of elasticity, an amount of stiffness, or both, selected for moving the target object within a work area.

18. A soft robotic gripper system, comprising:
tentacles, each tentacle includes lower and upper members connected by a connector, each member has guide discs attached along the member to maintain spacing between the guide discs, and each guide disc includes a ring with passthrough holes, and a spacer located in a donut hole of the ring that has passthrough holes, while the ring and spacer passthrough holes collectively define cable pathways, wherein the connector includes a center thru-hole and transfer channels in a center portion each transfer channel includes a geometric feature having an entry aperture with a cable entry path tangential to an inner surface of the center thru-hole, and an exit aperture with a cable exit path parallel to a center axis of the connector; and
cables having proximal ends coupled to actuators outside of the lower member that extend from the actuators through apertures of a controllable palm baseplate located at a proximal end of the lower member, such that a set of lower cables extend through the lower ring passthrough holes to couple to a distal lower guide disc, and a set of upper cables extend through the lower spacer passthrough holes of the lower guide rings, through the transfer channels to the upper ring passthrough holes to couple to a distal upper guide ring, wherein an end cap is attached to the distal end of the upper member;
a centralized control system configured to:
receive tentacle data and sensor data from a transceiver;
compare stored object configurations to obtain a corresponding stored object configuration using the sensor data, and compare stored commands to obtain stored sets of commands corresponding to the stored object configuration;
compare stored tentacle actions associated with the stored object configuration to obtain a corresponding stored set of tentacle actions using the received tentacle data, and compare the stored sets of commands to obtain a corresponding first set of commands, if the tentacle actions from the tentacle data do not correspond to the stored object configuration, then select a second set of commands; and
generate a sequence of control signals that cause motors for each tentacle of the tentacles to apply a sequence of tensions to transmission systems to each tentacle, to move a target object, according to the selected set of commands associated.

19. The soft robotic gripper system of claim 18, wherein the selected set of commands includes a sequence of predetermined torques to be applied to one or more joints or flexural joints along with corresponding tensions to apply to a plurality of transmission systems of each tentacle of the tentacles, such that each transmission system has a first end connected to a motor and a second end connected to a joint or a flexural joint.

20. The soft robotic gripper system of claim 18, wherein the sensor data includes distal joint sensors located in at least one end tip of at least one tentacle, such that the distal joint sensors include distributed shape sensors or linear displacement sensors.

21. A soft robotic gripper system, comprising:
tentacles, each tentacle includes lower and upper members connected by a connector, each member has guide discs attached along the member to maintain spacing between the guide discs, and each guide disc includes a ring with passthrough holes, and a spacer located in a donut hole of the ring that has passthrough holes, while the ring and spacer passthrough holes collectively define cable pathways;
a connector includes a center thru-hole and transfer channels in a center portion each transfer channel includes a geometric feature having an entry aperture with a cable entry path tangential to an inner surface of the center thru-hole, and an exit aperture with a cable exit path parallel to a center axis of the connector;
cables having proximal ends coupled to actuators outside of the lower member that extend from the actuators through apertures of a controllable palm baseplate located at a proximal end of the lower member, such that a set of lower cables extend through the lower ring passthrough holes to couple to a distal lower guide disc, and a set of upper cables extend through the lower spacer passthrough holes of the lower guide rings, through the transfer channels to the upper ring passthrough holes to couple to a distal upper guide ring, wherein an end cap is attached to the distal end of the upper member;
a centralized control system configured to:
receive tentacle data and sensor data from a transceiver;
compare stored object configurations to obtain a corresponding stored object configuration using the sensor data, and compare stored commands to obtain stored sets of commands corresponding to the stored object configuration;
compare stored tentacle actions associated with the stored object configuration to obtain a corresponding stored set of tentacle actions using the received tentacle data, and compare the stored sets of commands to obtain a corresponding first set of commands, if the tentacle actions from the tentacle data do not correspond to the stored object configuration, then select a second set of commands, wherein the selected set of commands includes a sequence of predetermined torques to be applied to one or more joints or flexural joints along with corresponding tensions to apply to a plurality of transmission systems of each tentacle of the tentacles, such that each transmission system has a first end connected to a motor and a second end connected to a joint or a flexural joint; and
generate a sequence of control signals that cause motors for each tentacle of the tentacles to apply a sequence of tensions to transmission systems to each tentacle, to move a target object, according to the selected set of commands associated.

* * * * *